(12) United States Patent
Elfadel et al.

(10) Patent No.: US 8,122,419 B2
(45) Date of Patent: Feb. 21, 2012

(54) SYSTEM AND METHOD FOR THREE-DIMENSIONAL VARIATIONAL CAPACITANCE CALCULATION

(75) Inventors: Ibrahim M. Elfadel, Cortlandt Manor, NY (US); Tarek A. El-Moselhy, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 598 days.

(21) Appl. No.: 12/267,598

(22) Filed: Nov. 9, 2008

(65) Prior Publication Data

US 2010/0122222 A1 May 13, 2010

(51) Int. Cl.
    *G06F 17/50* (2006.01)
(52) U.S. Cl. ......... 716/126; 716/104; 716/129; 716/130
(58) Field of Classification Search .................. 716/104, 716/126, 129–130
    See application file for complete search history.

(56) References Cited

U.S. PATENT DOCUMENTS

| | | | |
|---|---|---|---|
| 6,305,004 B1 * | 10/2001 | Tellez et al. ................... | 716/129 |
| 6,314,545 B1 | 11/2001 | Kapur et al. | |
| 6,871,167 B1 | 3/2005 | Kapur et al. | |
| 6,883,148 B1 | 4/2005 | Teig et al. | |
| 7,051,293 B1 | 5/2006 | Teig et al. | |
| 7,103,524 B1 | 9/2006 | Teig et al. | |
| 7,197,729 B2 | 3/2007 | Batterywala | |
| 7,283,943 B1 | 10/2007 | Qi et al. | |
| 7,805,697 B2 * | 9/2010 | Wood ............................ | 716/113 |
| 2009/0037852 A1 * | 2/2009 | Kobayashi et al. ................ | 716/2 |
| 2009/0248335 A1 | 10/2009 | Elfadel et al. | |
| 2009/0288056 A1 * | 11/2009 | Gitchev et al. .................. | 716/12 |
| 2009/0307645 A1 * | 12/2009 | Buck et al. ........................ | 716/6 |

OTHER PUBLICATIONS

Iverson et al., "A Floating Random-Walk Algorithm for Extracting Electrical Capacitance," Mathematics and Computers in Simulation, vol. 55, No. 1-3 (Feb. 2001).

Iverson et al., "A Stochastic Algorithm for High-Speed Capacitance Extraction in Integrated Circuits," Solid-State Electronics, vol. 35, No. 7, pp. 1005-1012 (1992).

K. Nabors et al., "Fastcap: A Multipole Accelerated 3-D Capacitance Extraction Program," IEEE Transactions on Computer-Aided Design, vol. 10, No. 11 (Nov. 1991).

Brambilla et al., "A Statistical Algorithm for 3-D Capacitance Extraction," IEEE Microwave and Guided Wave Letters, vol. 10, No. 8 (Aug. 2000).

P.S. Sumant et al., "Algebraic Multigrid Laplace Solver for the Extraction of Capacitances of Conductors in Multi-Layer Dielectrics," Department of Electrical and Computer Engineering, University of Illinois at Urbana-Champaign, Urbana, IL 61801 (2007).

(Continued)

*Primary Examiner* — Stacy Whitmore
(74) *Attorney, Agent, or Firm* — Preston Young; Michael J. Chang, LLC

(57) ABSTRACT

Capacitance extraction techniques are provided. In one aspect, a method for analyzing variational coupling capacitance between conductors in an integrated circuit design is provided. The method comprises the following steps. Coupling capacitance is computed between conductors of interest from the design using a set of floating random walk paths. One or more of the conductors are perturbed. Any of the floating random walk paths affected by the perturbation are modified. The coupling capacitance between the conductors of interest is recomputed to include the modified floating random walk paths.

21 Claims, 13 Drawing Sheets

OTHER PUBLICATIONS

McDonald et. al., "Application of a Floating-Random-Walk Algorithm for Extracting Capacitances in a Realistic HBT Fast-RISC RAM Cell," Proc. IEEE VLSI Multi-Layer Interconnect Conference, VMIC 94, pp. 542-544 (Jun. 1994).

Husain, "Models for Interconnect Capacitance Extraction," IEEE, pp. 167-172 (2001).

IBM, "Rapid Extraction of Electrical Parasitics for Interconnect Wires on Semiconductor Chips," IP.com, IPCOM000033527D (2004).

Batterywala, et al., "Variance Reduction in Monte Carlo Capacitance Extraction," Proceedings of the 18th International Conference on VLSI Design held jointly with 4th International Conference on Embedded Systems Design (VLSID 05) (2005).

T.A. Ei-Moselhy, et al., "Efficient Algorithm for the Computation of On-Chip Capacitance Sensitivities with Respect to a Large Set of Parameters," DAC 2008, Anaheim, California (Jun. 8-13, 2008).

Jere, et al, "An Improved Floating-Random-Walk Algorithm for Solving the Multi-Dielectric Dirichlet Problem," IEEE Transactions on Microwave Theory & Techniques, vol. 41, No. 2, pp. 325-329 (1993).

Parks et al., "Recycling Krylov Subspaces for Sequences of Linear Systems," SIAM Journal on Scientific Computing, vol. 28, No. 5, pp. 1651-1674 (2006).

* cited by examiner

100

200

1200

1300

1400

1500

1600

1700

1800

SYSTEM AND METHOD FOR THREE-DIMENSIONAL VARIATIONAL CAPACITANCE CALCULATION

FIELD OF THE INVENTION

The present invention relates to integrated circuit design, and more particularly, to techniques for sensitivity and incremental variational capacitance analysis of integrated circuit designs.

BACKGROUND OF THE INVENTION

Fast and efficient capacitance extraction is the cornerstone of integrated circuit electrical evaluation. For the past decade, a number of different approaches have been proposed to analyze capacitance. These approaches can be divided into two categories, one being deterministic techniques, such as boundary element or finite difference methods, and the other being stochastic techniques, such as floating random walk. In general, deterministic techniques involve solving linear system functions. However, for large integrated circuit geometries, the time needed to obtain the linear system solutions dominates the computational complexity. Different acceleration tools ("fast-solvers"), such as pre-corrected fast Fourier transform, multipole expansion and hierarchical techniques, have been proposed to speed up the system solves.

Even with these enhancement tools, deterministic techniques prove to be too inefficient for use with complex designs that involve a very large number of similar configurations. Take for example, the generation of capacitance tables used in macro and full-chip parasitic layout extraction and the generation of parameterized reduced-order models used in timing and noise analysis. Such models require the presolution of a large number of similar configurations to build a representative set of capacitances corresponding to a representative set of parameters. Another example is the extraction of capacitance distributions as is found in a number of stochastic extraction techniques, such as the stochastic collocation algorithm. All of these examples require as a fundamental step the solution of a very large number of similar configurations.

FIG. 1 is image 100 illustrating wafer contours present in an active area of a static random access memory (SRAM) cell designed in a 45 nanometer (nm) technology. The highly irregular contours shown in image 100 are present despite the use of lithographic improvement techniques such as optical pre-correction and resolution enhancement. While contour-aware extraction has been proposed to improve the accuracy of layout parasitics in the presence of lithographic irregularities, the highly irregular nature of these contours make such an approach very time consuming.

Lithography mainly impacts the layout shapes in mask planes. Chemical-mechanical polishing (CMP), on the other hand, contributes to uncertainties in interconnect heights perpendicular to the mask planes. These uncertainties further highlight a need for fast extraction techniques that can accommodate a large number of similar configurations.

Capacitance extraction in the context of a large number of similar configurations is generally implemented using an adjoint method, which facilitates computing the sensitivity of a capacitance matrix (more precisely a vector in the capacitance matrix) with respect to a large number of independent variations with a computational complexity independent of the number of parameters. However, the total time required to compute the sensitivities is approximately 2.5 times that required to solve the nominal system. There is still however, a vast amount of room for improvement, especially when large, complex design configurations are involved. With such complex design configurations, conventional approaches such as the adjoint method prove too inefficient for mainstream use.

Therefore, improved capacitance extraction techniques that can accommodate a large number of similar configurations would be desirable.

SUMMARY OF THE INVENTION

The present invention provides capacitance extraction techniques. In one aspect of the invention, a method for analyzing variational coupling capacitance between conductors in an integrated circuit design is provided. The method comprises the following steps. Coupling capacitance is computed between conductors of interest from the design using a set of floating random walk paths. One or more of the conductors are perturbed. Any of the floating random walk paths affected by the perturbation are modified. The coupling capacitance between the conductors of interest is recomputed to include the modified floating random walk paths.

A conductor to be perturbed can be selected from the design. An edge of the selected conductor on which one or more of the floating random walk paths terminate can be chosen. The edge of the selected conductor can be perturbed inward by an amount that changes a geometry of the selected conductor by less than or equal to about 10 percent. Any of the floating random walk paths that terminate on the unperturbed edge can be extended to the perturbed edge. The coupling capacitance between the conductors of interest can be recomputed to include the extended floating random walk paths. Coupling capacitance sensitivity can be determined with respect to the perturbed edge.

Further, any of the floating random walk paths that do not terminate on the unperturbed edge but are still affected by the perturbation can be identified. It can be determined if each of the identified floating random walk paths is still valid. Any of the identified floating random walk paths that are invalid after the perturbation can be modified.

The one or more conductors can be perturbed to create a new integrated circuit design, wherein each of the one or more conductors is perturbed by an amount that changes a geometry of that conductor by greater than or equal to about 10 percent. The floating random walk paths can be mapped to the new integrated circuit design. It can be determined whether each of the floating random walk paths mapped to the new integrated circuit design is valid in the new integrated circuit design. Any of the floating random walk paths mapped to the new integrated circuit design that are invalid can be modified. Any of the floating random walk paths mapped to the new integrated circuit design that are valid can be maintained. Coupling capacitance can be computed between conductors of interest from the new integrated circuit design.

For a given one of the floating random walk paths, it can be determined on which of the conductors the floating random walk path is dependent. The design can be graphically represented in a manner that depicts the conductors, the floating random walk path and on which of the conductors the floating random walk path is dependent. One or more of the conductors can be perturbed by an amount that changes a geometry of each of the perturbed conductors by greater than or equal to about 10 percent. The graphical representation of the design can be used to determine whether or not the floating random walk path is dependent on the one or more perturbed conductors. The floating random walk path can be modified if the floating random walk path is dependent on the one or more perturbed conductors. The floating random walk path can be maintained if the floating random walk path is not dependent on the one or more perturbed conductors.

A more complete understanding of the present invention, as well as further features and advantages of the present invention, will be obtained by reference to the following detailed description and drawings.

DETAILED DESCRIPTION OF PREFERRED EMBODIMENTS

Figure 1:
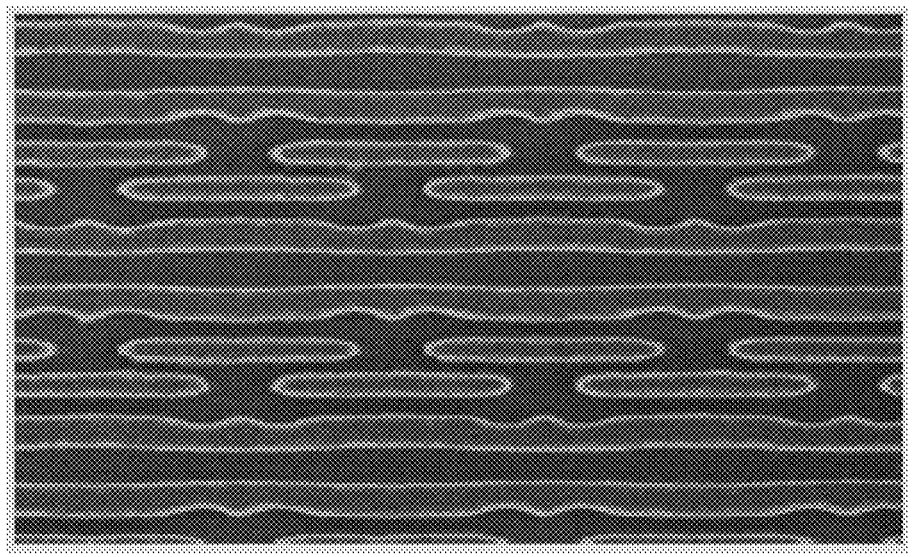
FIG. 1 is an image illustrating wafer contours present in an active area of a static random access memory (SRAM) cell.
Figure 2:
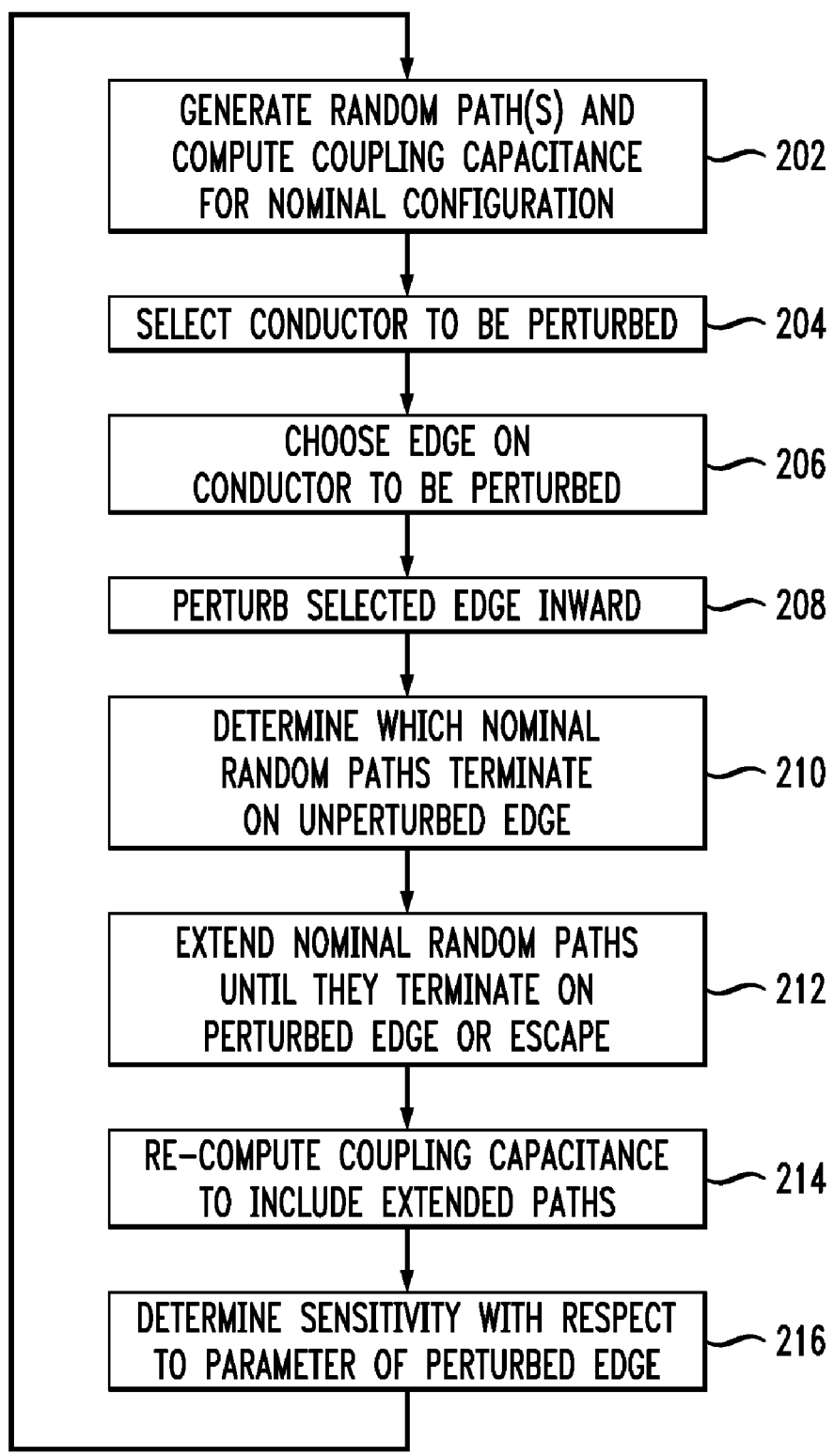
FIG. 2 is a diagram illustrating an exemplary methodology for determining coupling capacitance sensitivity between conductors in an integrated circuit design according to an embodiment of the present invention.

The techniques presented herein are directed to sensitivity variational capacitance analysis of integrated circuit designs, e.g., when changes in the design are small, and incremental variational capacitance analysis of integrated circuit designs, e.g., when changes in the design are large. For example, FIG. 2 is a diagram illustrating exemplary methodology 200 for determining coupling capacitance sensitivity between conductors in an integrated circuit design. In step 202, coupling capacitance between conductors of interest from the design (i.e., a nominal coupling capacitance) is computed using a floating random walk technique. Floating random walk techniques are described in detail below. In general, however, a floating random walk technique involves creating one or more floating random walk paths that start at a given conductor and terminate on another, target conductor. This set of floating random walk paths can be used to compute coupling capacitance between the conductors.

In step 204, one of the conductors from the design is selected to be perturbed. As will be described below, methodology 200 can be repeated multiple times thus involving the perturbation of multiple conductors. Collectively, the perturbations can be done either on a subset of the conductors or on all of the conductors. When a subset of the conductors is chosen, selection criteria can include the absolute or relative size of the perturbation that the conductor is undergoing, as well as a contribution of the selected conductor to the total capacitance of the electrical network to which the given conductor belongs. As will be apparent from the following description, perturbing a given one of the conductors allows for a capacitance sensitivity analysis of the design to be conducted based on changes in the geometry of the selected conductor. A slight change in the shape of a conductor can occur during normal operation of an integrated circuit. This sensitivity analysis simulates such a change. The term 'slight', as used herein, refers to less than or equal to about a 10 percent change in a given parameter of a conductor. For example, as will be presented below, when an edge of a given conductor is perturbed (changed), the change will be considered slight for the purposes of sensitivity analysis if the change impacts less than or equal to about 10 percent of the conductor geometry, pre-versus post-perturbation. See description below for more details.

In step 206, an edge of the conductor selected in step 204, is chosen to be perturbed. The edge to be perturbed is chosen according to the type of electrical analysis being conducted. By way of example only, when signal integrity analysis is sought, a vertical edge of the conductor is selected. It is assumed in this process that chosen edge is one on which one or more of the floating random walk paths terminate. In step 208, the chosen edge is perturbed inward. As highlighted above, in a sensitivity calculation this perturbation is set to less than or equal to about 10 percent of the nominal value of the geometric parameter of interest. As will be described in detail below, the present sensitivity analysis does not depend on whether the perturbation corresponds to an increase or a decrease in a parameter, as long as the perturbation is small. Thus, for every iteration of methodology 200, the chosen edge of a given conductor can be perturbed inward, i.e., the parameter perturbation is such that the computational domain is extended.

Once the edge is perturbed inward, those floating random walk paths that once terminated on the unperturbed edge will be affected, i.e., they will end up as uncompleted paths. It is likely that a number of the floating random walk paths from step 202 (described above) never terminated on the unperturbed edge to begin with. Thus to focus the analysis, in step 210, a determination can be made as to which paths originally terminated on the unperturbed edge.

In step 212, the uncompleted paths are modified, in this case extended, until they once again terminate on the edge (the perturbed edge) or escape, i.e., some of the extended paths might stray and not reach the target conductor (see, for example, FIG. 3, described below). In step 214, the coupling capacitance is recomputed, this time including the extended floating random walk paths in the calculations. In step 216, the coupling capacitance sensitivity is determined with respect to the perturbed edge, which as will be described in detail below, is based on the coupling capacitance from the unperturbed (nominal) state (step 202) and the coupling capacitance from the perturbed state (step 214).

The steps of methodology 200 can be repeated until perturbation of a desired number of conductors has been performed (see above). As is apparent from the above description, the perturbed edge is on a conductor that is involved in the coupling capacitance calculation. Capacitance sensitivity techniques are also provided herein that address the situation where the perturbed edge is on a conductor that is not involved in the coupling capacitance calculation (see below).

Figure 3:
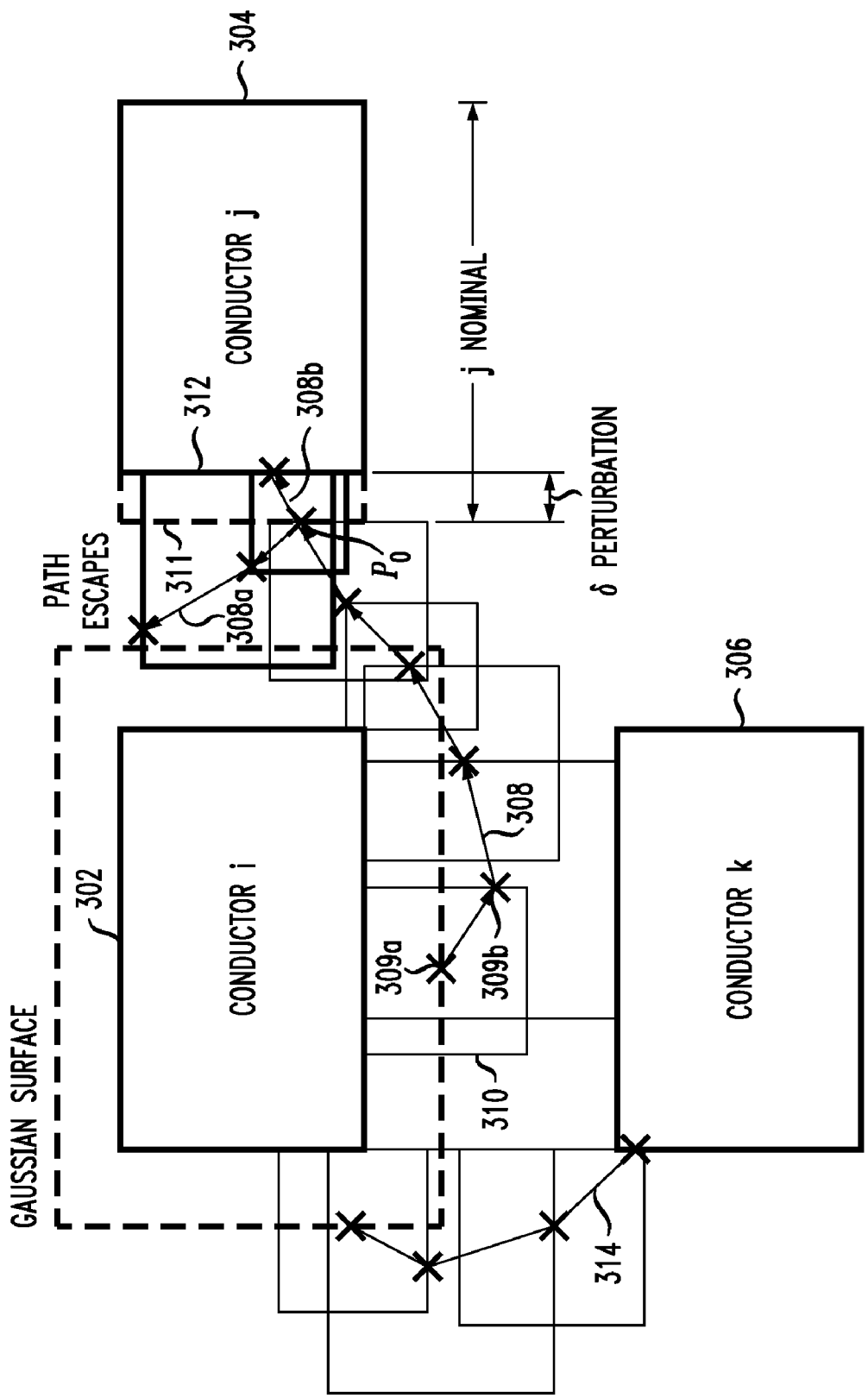
FIG. 3 is a diagram illustrating perturbation of an edge of a conductor that is involved in a coupling capacitance calculation according to an embodiment of the present invention.

FIG. 3 is a diagram illustrating perturbation of an edge of a conductor that is involved in a coupling capacitance calculation. FIG. 3 is a schematic depiction of an exemplary iteration of methodology 200 (FIG. 2), see above. In FIG. 3, conductors 302 and 304 and 306 are shown labeled "conductor i," "conductor j" and "conductor k," respectively. A floating random walk path 308 has been created that begins on a Gaussian surface around conductor 302 (see description below regarding the floating random walk process) and terminates, preliminarily, on unperturbed edge 311 of conductor 304. Floating random walk path 308 follows a series of randomly selected points, i.e., on the Gaussian surface (point 309a) and on maximal bounding cubes 310 (points 309b) between the conductors (see description below regarding the floating random walk process). This preliminary floating random walk path is also referred to herein as a nominal path. The nominal path corresponds to a floating random walk path executed for the case where none of the conductors is changed/modified. When edge 311 of conductor 304 is perturbed, floating random walk path 308 becomes incomplete. It is notable that for perturbation δ to be a slight perturbation for the purposes of sensitivity analysis, δ should be less than or equal to 10 percent of, e.g., the nominal dimension $j_{nominal}$. According to methodology 200, floating random walk path 308 is then modified, i.e., extended, until it either escapes (e.g., path 308a) or terminates on perturbed edge 312 of conductor 304 (e.g., path 308b). Another nominal floating random walk path 314 is shown beginning on the Gaussian surface around conductor 302 and terminating on conductor 306. Floating random walk path 314 is created in the same manner as floating random walk path 308. However, since floating random walk path 314 does not involve a perturbed conductor, then it remains unmodified. The capacitance calculations from the nominal paths and the extended path can be used to calculate capacitance sensitivity with respect to perturbed edge 312. See, for example, FIG. 4, described below.

Figure 4:
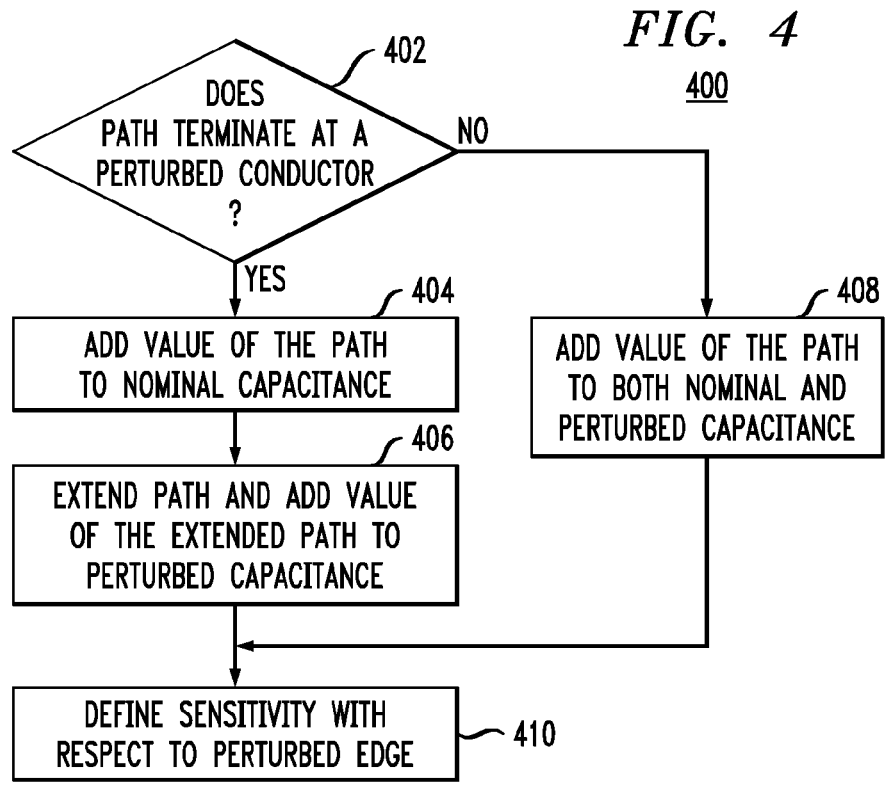
FIG. 4 is a diagram illustrating an exemplary methodology for using nominal and post-perturbation floating random walk paths to determine capacitance sensitivity according to an embodiment of the present invention.

FIG. 4 is a diagram illustrating an exemplary methodology 400 for using nominal and post-perturbation floating random walk paths to determine capacitance sensitivity. For illustrative purposes, methodology 400 will be described in the context of the exemplary configuration shown in FIG. 3, and described above, but is however generally applicable to any conductor configuration. In step 402, for any given floating random walk path that has been created, a determination is made as to whether or not that path terminated at a perturbed conductor. For example, by way of reference to FIG. 3, path 308 terminates at a perturbed conductor and path 314 does not terminate at a perturbed conductor. If the path in question terminates at a perturbed conductor, then in step 404, the value of the nominal path (the path pre-perturbation) is added to a nominal capacitance for the design. For example, by way of reference to FIG. 3, since path 308 terminates at perturbed conductor j, then the value of the path is added to only the nominal capacitance $C_{ij}$. The path is then extended until it again terminates on the perturbed conductor (or potentially on another conductor) (see above) and in step 406, the value of the extended path is added to the perturbed capacitance. For example, by way of reference to FIG. 3, the value of the perturbed path is added to the perturbed capacitance $\tilde{C}_{im}$. The m index is used to include the option that when the path is continued, the path might land on a conductor that is different than the target conductor (the target conductor being conductor j in the case of FIG. 3).

On the other hand, if the path in question does not terminate at a perturbed conductor, then in step 410, the value of the path is added to both the nominal and perturbed capacitance. For example, by way of reference to FIG. 3, since path 314 terminates at non-perturbed conductor k, then the value of the path is added to both the nominal capacitance $C_{ik}$ and the perturbed capacitance $\tilde{C}_{ik}$. In step 410, the capacitance sensitivity (C.S.) is defined with respect to the changed parameter, i.e., the perturbed edge. For example, by way of reference to FIG. 3, the sensitivity of $C_{ik}$ with respect to the $\delta_j$ change in parameter $P_j$ is defined as $$C.S. = \frac{\tilde{C}_{ik} - C_{ik}}{\delta_j}.$$

It is notable that if the perturbed conductor is not part of the capacitance calculation (see below), then the sensitivity of the capacitance with respect to that perturbed capacitor is zero.

The present floating random walk-based finite difference sensitivity analysis does not depend on the exact magnitude of the parameter perturbation or whether such a perturbation corresponds to an increase or decrease of the parameters (as long as the perturbation is small). Consequently, the geometrical perturbation can always be defined such that the computational domain is extended or equivalently the metal (conductor) domain is reduced (as demonstrated, for example, with the δ shift in conductor j in FIG. 3). Since the computational domain is extended under such construction, all transition cubes can be reused. However, those cubes that were constrained by the perturbed boundaries (before perturbation) may not touch any conductor edges in the perturbed geometry (post perturbation). Consequently, such transition cubes are such that the probability of stopping is zero. This new characteristic indicates that a difference between a random walk in the nominal and perturbed geometries occurs if and only if a path in the nominal geometry terminates at any conductor edge defining the geometrical perturbation (e.g., termination point $p_0$ in FIG. 3). Such a path will not stop in the perturbed geometry and must therefore be continued with respect to the perturbed geometry. The value of the continued path is then added to the appropriate capacitance based on the conductor at which it terminates. This discussion motivates computing the relative change in the capacitance $C_{ix}$, $x \in \{1.2 \ldots, N\}$ due to a change $\delta_j$ in a parameter $P_j$ associated with conductor j.

The path continuation step can be interpreted as starting the floating random walk from a distance $\delta$ away from the conductor surface and determining if the random walk manages to continue past the surface of conductor j (FIG. 3). Thus the perturbation in the capacitance is proportional to the number of paths that manage to continue (path 308a in FIG. 3). Such interpretation reveals that the perturbed system converges on average in a very small number of steps. In fact most walks terminate at conductor j in one iteration (path 308b in FIG. 3), since the difference between the capacitance of the nominal and perturbed system is small.

Figure 5:
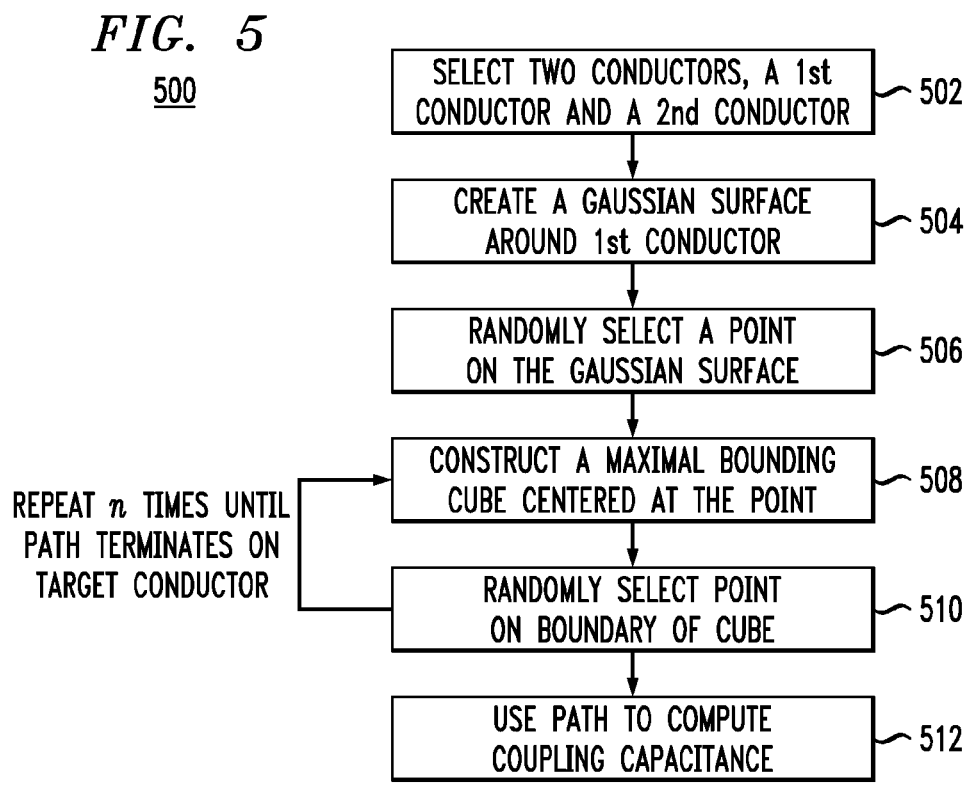
FIG. 5 is a diagram illustrating an exemplary methodology for using a floating random walk technique to determine coupling capacitance between conductors in an integrated circuit design according to an embodiment of the present invention.

FIG. 5 is a diagram illustrating exemplary methodology 500 for using a floating random walk technique to determine coupling capacitance between two conductors, i.e., a first conductor and a second conductor. In step 502, two conductors are selected from the design. Again by way of reference to the configuration shown in FIG. 3 for example, conductors 302 and 304 are the conductors selected for capacitance analysis. In step 504, a Gaussian surface is created around one of the conductors. The process can begin at either conductor. In this case the Gaussian surface is arbitrarily created around the first conductor. See, for example, FIG. 3 wherein a Gaussian surface is created around conductor 302.

In step 506, a point is randomly selected on the Gaussian surface. See, for example, FIG. 3 wherein point 309a is randomly selected on the Gaussian surface. In step 508, a maximal bounding cube is constructed containing, e.g., centered at, the randomly selected point. See, for example, FIG. 3 wherein bounding cube 310 is centered around point 309a. The bounding cube is constructed so as to extend to the edge of the nearest conductor but not to include a conductor. In step 510, a point is randomly selected on a boundary of the bounding cube. See, for example, FIG. 3 wherein point 309b is selected on the boundary of the first bounding cube 310 in the series.

Steps 508 and 510 are repeated n times until the floating random walk path terminates on the target conductor, in this case the second conductor. In step 512, the floating random walk path is used to compute coupling capacitance between the selected conductors.

The floating random walk technique is based on expressing the capacitance $C_{ij}$ between conductor i and conductor j (see, for example, FIG. 3) as a multidimensional (possibly infinite dimensional) integral of the prescribed conductor potentials. When extracting $C_{ij}$, conductor j is assumed at unit potential, while all the other conductors are at zero potential. The formulation starts with expressing the capacitance $C_{ij}$, or equivalently the total charge $q_i$ at conductor i, as a function of the electric field $\vec{E}(r)$:

$$C_{ij} = q_i \mid (\phi_j = 1) \quad (1)$$
$$= \int_{S_0} \vec{E}(\eta^{(0)}) \cdot \hat{n} d\eta^{(0)} = \int_{S_0} -\nabla \phi(\eta^{(0)}) \cdot \hat{n} d\eta^{(0)},$$

wherein $S_0$ is a Gaussian surface surrounding conductor i, $\hat{n}$ is the corresponding normal and $\phi(\eta^{(0)})$ is the electrostatic potential. The idea is to use Green's function to write the potential $\phi(\eta^{(0)})$ as a function of the potential of a surrounding boundary. This boundary is arbitrary provided the domain is homogeneous (the homogeneity constraint may be relaxed so that multilayered media can be handled efficiently, see below). In the basic form of the floating random walk technique, the potential of a point $\eta^{(0)}$ is written in terms of the potential at the boundary of the largest bounding cube $S_1$ centered around $\eta^{(0)}$ and extending to the edge of the nearest conductor (but not including any conductor(s)). Thus, the potential is given by:

$$\phi(\eta^{(0)}) = \int_{S_1} G(\eta^{(0)}, \eta^{(1)}) \phi(\eta^{(1)}) d\eta^{(1)}, \quad (2)$$

wherein $G(\eta^{(0)}, \eta^{(1)})$ is the Green's function associated with the Laplace equation in the square $S_1$ domain. One of the main ideas behind the floating random walk technique is the interpretation of $G(\eta^{(0)}, \eta^{(1)})$ as a probability density function. This follows directly from the maximum principle of harmonic functions and from the uniqueness of the solution theorem, since if the entire boundary has unit potential then the solution of the Laplace equation within the entire square domain is also a constant unit potential, i.e., $$1 = \int_{S_1} G(\eta^{(0)}, \eta^{(1)}) d\eta^{(1)}.$$

With this probabilistic interpretation, the Green's function of a given transition square can be identified with a transition probability that measures the likelihood of a point $\eta^{(0)}$ inside the square to be connected with a point $\eta^{(1)}$ on the boundary. In the following description, the terminology of a transition square and a transition probability will be used, the latter interchangeably with a Green's function.

It is notable that by construction, part of the boundary of the bounding square is touching at least part of some conductor boundary and therefore has a prescribed potential. Therefore, Equation 2, above, can be re-written as:

$$\phi(\eta^{(0)}) = \int_{K_1} G(\eta^{(0)}, \eta^{(1)}) \phi(\eta^{(1)}) d\eta^{(1)} + + \int_{U_1} G(\eta^{(0)}, \eta^{(1)}) \phi(\eta^{(1)}) d\eta^{(1)}, \quad (3)$$

wherein $K_1$ is the part of the boundary with the specified potential, whereas $U_1$ is the part of the boundary not touching any conductor and therefore its potential is unspecified and yet to be determined. The unknown potential associated with a point on $U_1$ is then rewritten in terms of the potential over another bounding square constructed as explained above. This process is then repeated recursively to result in the following expansion:

$$\phi(\eta^{(0)}) = \int_{K_1} d\eta^{(1)} G(\eta^{(0)}, \eta^{(1)}) \phi(\eta^{(1)}) + + \quad (4)$$
$$\int_{U_1} d\eta^{(1)} G(\eta^{(0)}, \eta^{(1)}) \int_{K_2} d\eta^{(2)} G(\eta^{(1)}, \eta^{(2)}) \phi(\eta^{(2)}) +$$
$$\ldots + \int_{U_1} d\eta^{(1)} G(\eta^{(0)}, \eta^{(1)}) \int_{U_2} d\eta^{(2)} G(\eta^{(1)}, \eta^{(2)}) \times \times$$
$$\ldots \int_{K_M} d\eta^{(M)} G(\eta^{(m-1)}, \eta^{(m)}) \phi(\eta^{(m)}).$$

The following notation is used to describe the multidimensional integral: $S_i = K_i \cup U_i$, wherein $K_i$ and $U_i$ are the parts of surface $S_i$ with known and unknown potentials, respectively. The resulting multidimensional integral is then computed using Monte Carlo integration which is then interpreted as a random. Each random walk is made up of a sequence of random steps. The random walk stops when the random step falls within a distance $\in$ from a conductor boundary. Consequently, the capacitance formula, i.e., Equation 4, above, is discretized within the floating random walk implementation as follows:

$$C_{ij} = q_i \mid_{(\phi_j = 1)} \quad (5)$$

$$= \sum_{i_0=1}^{N_0} \Delta_{i_0} \sum_{i_1=1}^{N_1} \nabla_n G(\eta_{i_0}^{(0)}, \eta_{i_1}^{(1)}) \Delta_{i_1} \phi_j +$$

$$+ \sum_{i_0=1}^{N_0} \Delta_{i_0} \sum_{i_1=1}^{N_1} \nabla_n G(\eta_{i_0}^{(0)}, \eta_{i_1}^{(1)}) \Delta_{i_1} \sum_{i_2=1}^{N_2} G(\eta_{i_1}^{(1)}, \eta_{i_2}^{(2)}) \Delta_{i_2} \phi_j +$$

$$+ \sum_{i_0=1}^{N_0} \Delta_{i_0} \sum_{i_1=1}^{N_1} \nabla_n G(\eta_{i_0}^{(0)}, \eta_{i_1}^{(1)}) \Delta_{i_1} \times$$

$$\times \sum_{i_2=1}^{N_2} G(\eta_{i_1}^{(1)}, \eta_{i_2}^{(2)}) \Delta_{i_2} \dots \sum_{i_m=1}^{N_m} G(\eta_{i_{m-1}}^{(m-1)}, \eta_{i_m}^{(m)}) \Delta_{i_m} \phi_j,$$

wherein $\Delta_{i_m}$ is the $i_m^{th}$ incremental distance on surface m. Note that when extracting $C_{ij}$, all conductors except the $j^{th}$ conductor are assumed grounded. Consequently, one can extract in parallel all $C_{ix}$:$x \in \{1, 2, \ldots, N\}$, wherein N is the total number of conductors.

Use of a floating random walk technique has several notable benefits. First, the floating random walk technique can be used to efficiently solve a very large number K of similar configurations in a time almost completely independent of the number of configurations K. Second, the complexity of the floating random walk technique is independent of the number of conductors in a design and thus can enable efficient handling of large, very complex conductor systems. Third, the floating random walk technique is extremely efficient in terms of memory utilization since it does not involve matrix assembly or system solves. Fourth, the floating random walk technique offers the ability to report intermediate results with error bounds, which enables the design of stopping criteria that are in line with the required accuracy of the extraction case at hand. Fifth, the floating random walk technique is very amenable to parallelization and can therefore utilize current advances in multithreaded, multicore computer architectures. In the present teachings, the floating random walk technique is configured to efficiently handle three-dimensional multilayered dielectric configurations.

A floating random walk technique that can be used to efficiently and effectively determine coupling capacitance between conductors in a three-dimensional integrated circuit configuration, even when arbitrary multilayered dielectric media is present, is described in U.S. Patent Application Publication Number 2010/0122223 A1 entitled "Techniques for Computing Capacitances in a Medium With Three-Dimensional Conformal Dielectrics" (hereinafter "U.S. Patent Application Publication Number 2010/0122223 A1") the contents of which are incorporated by reference herein. The techniques described in U.S. Patent Application Publication Number 2010/0122223 A1 can be used to determine capacitance as required in the present techniques.

Figure 6:
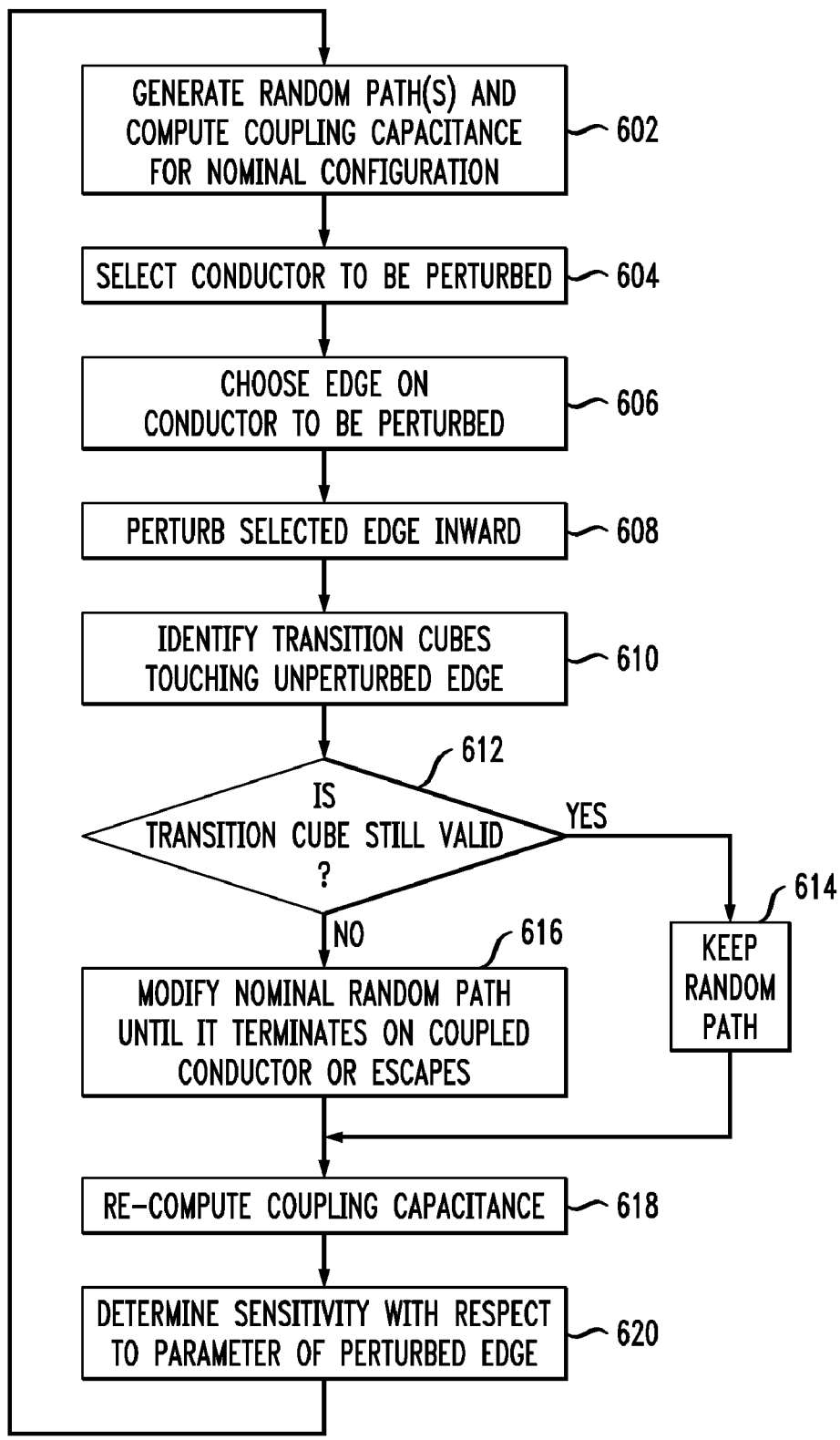
FIG. 6 is a diagram illustrating another exemplary methodology for determining coupling capacitance sensitivity between conductors in an integrated circuit design according to an embodiment of the present invention.

As highlighted above, it is also possible that the perturbed edge is on a conductor that is not involved in the coupling capacitance calculation. Methodology 600 shown illustrated in FIG. 6 addresses this situation. In step 602, coupling capacitance between conductors of interest from the design (i.e., the nominal coupling capacitance) is computed using a floating random walk technique as described above.

In step 604, one of the conductors from the design is selected to be perturbed. Since methodology 600 also deals with sensitivity variational capacitance analysis, the perturbation is small, as defined above. Methodology 600 can be repeated multiple times thus involving the perturbation of multiple conductors. As above, collectively, the perturbations can be done either on a subset of the conductors or on all of the conductors. When a subset of the conductors is chosen, the selection criteria can include the absolute or relative size of the perturbation that the conductor is undergoing, as well as the contribution of the selected conductor to the total capacitance of the electrical network to which the given conductor belongs. As will be apparent from the following description, perturbing a given one of the conductors allows for a capacitance sensitivity analysis of the design to be conducted based on changes in the geometry of the selected conductor. Slight changes in the shape of a conductor can occur during normal operation of an integrated circuit. This sensitivity analysis simulates such a change.

In step 606, an edge of the conductor selected in step 604 is chosen to be perturbed. As above, the edge is selected according to the type of electrical analysis to be conducted. By way of example only, when signal integrity analysis is sought, a vertical edge of the conductor is selected. It is assumed in this process that the chosen edge is not one on which the floating random walk path(s) involved in the coupling capacitance determination terminate (see step 602). In step 608, the chosen edge is perturbed inward. In a sensitivity calculation this perturbation is set to less than or equal to about 10 percent of the nominal value of the geometric parameter of interest. The present sensitivity analysis does not depend on whether the perturbation corresponds to an increase or a decrease in a parameter, as long as the perturbation is small. Thus, for every iteration of methodology 600, the chosen edge of a given conductor can be perturbed inward.

As described above, a floating random walk path can comprise a series of maximal bounding transition cubes, each of which is centered at a transition point and is constructed to extend to the edge of the nearest conductor but not to include a conductor. Therefore, the conductor perturbed in this process, although not involved in the capacitance calculation, can affect the path, e.g., may touch one or more of the transition cubes long the path. Therefore, when the edge is perturbed inward, those transition cubes that once touched the unperturbed edge may or may not any longer be valid. For example, it must be evaluated whether or not those transition cubes in question still extend to the edge of the nearest conductor after the perturbation. Thus in step 610, those transition cube(s) that originally touched the unperturbed edge are identified. Step 610 essentially seeks to identify those paths that while not terminating on the unperturbed edge are nonetheless affected by the perturbation. Then in step 612, a determination is made as to whether or not those transition cubes identified in step 610 (and hence the associated paths) are still valid or not. If the transition cubes/path are still valid, i.e., the cubes still extend to the edge of the nearest conductor after the perturbation, then in step 614 the associated random walk path is maintained. However, if the transition cubes/path are no longer valid, i.e., after the perturbation the transition cubes do not extend to the edge of the nearest conductor, then in step 616 the associated random walk path has to be modified. According to an exemplary embodiment, as much of the random walk path as possible is re-used. Therefore, the random walk path can be modified beginning at a transition cube immediately preceding an invalid cube. The above-described floating random walk techniques can then be used to complete the path, i.e., until the path either terminates on the target conductor or escapes.

In step 618, the coupling capacitance is re-computed. The re-computed coupling capacitance includes the values from step 614 or the modified path(s) from step 616. In step 620, the coupling capacitance sensitivity is determined with respect to the perturbed edge, which as will be described in detail below, is based on the coupling capacitance from the unperturbed (nominal) state (step 602) and the coupling capacitance from the perturbed state (step 618).

The steps of methodology 600 can be repeated until perturbation of a desired number of conductors has been performed (see above). Further, to obtain the capacitance sensitivity for a given integrated circuit design, it is likely that multiple iterations of methodology 200 (described above) in conjunction with multiple iterations of methodology 600 will have to be performed to address all conductor configurations wherein the perturbed conductor is or is not involved in the capacitance calculation, respectively.

Figure 7:
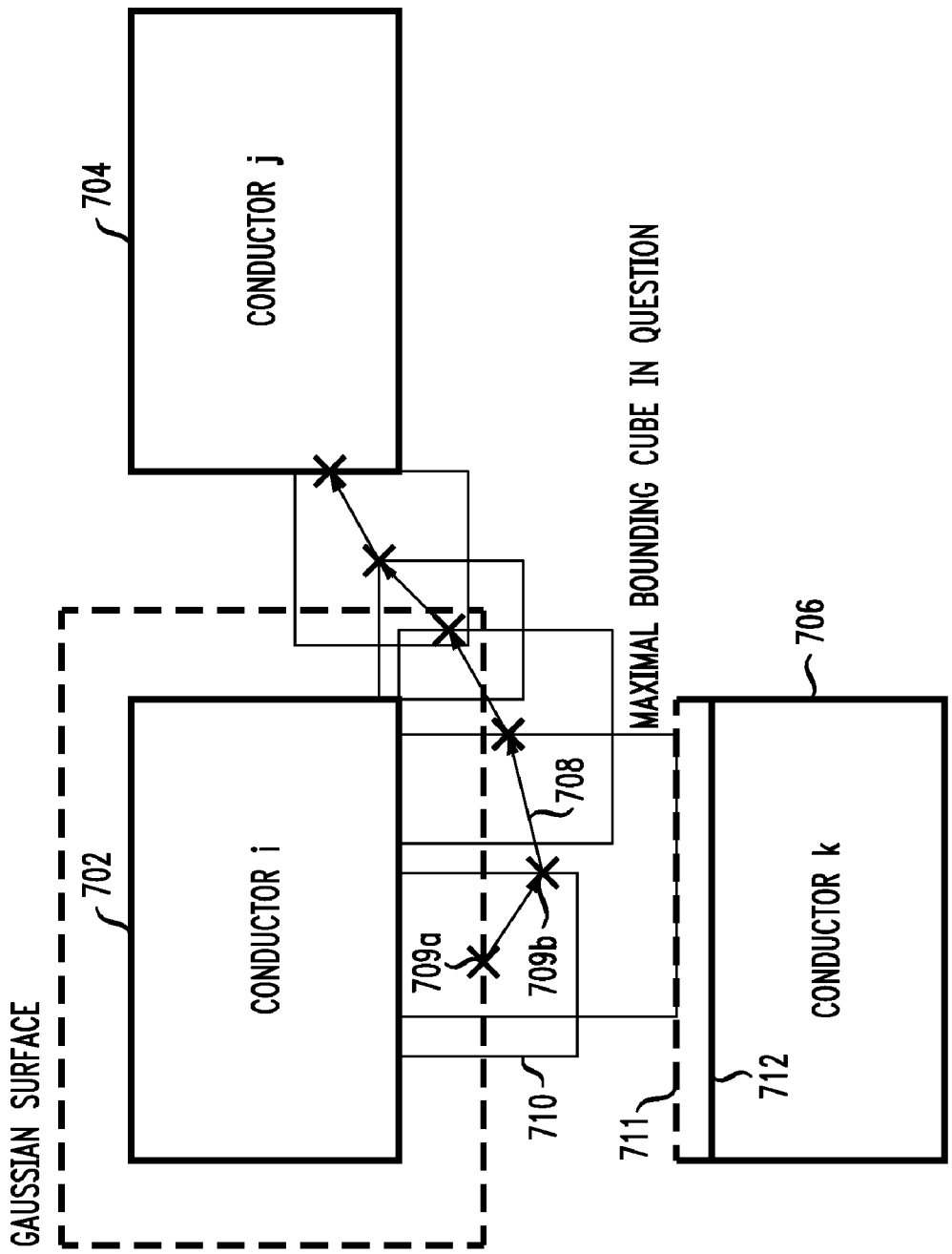
FIG. 7 is a diagram illustrating perturbation of an edge of a conductor that is not involved in a coupling capacitance calculation according to an embodiment of the present invention.

FIG. 7 is a diagram illustrating perturbation of an edge of a conductor that is not involved in a coupling capacitance calculation. FIG. 7 is a schematic depiction of an exemplary iteration of methodology 600, see above. In FIG. 7, conductors 702 and 704 and 706 are shown labeled "conductor i," "conductor j" and "conductor k," respectively. A floating random walk path 708 has been created that begins on a Gaussian surface around conductor 702 and terminates on conductor 704. Floating random walk path 708 follows a series of randomly selected points, i.e., on the Gaussian surface (point 709*a*) and on maximal bounding cubes 710 (points 709*b*) between the conductors. This floating random walk path is also referred to herein as a nominal path. According to the exemplary embodiment shown illustrated in FIG. 7, the conductor being perturbed, i.e., conductor 706, is not involved in the coupling capacitance calculation. Though, it is notable that unperturbed edge 711 of conductor 706 does touch the second maximal bounding cube along path 708, labeled "maximal bounding cube in question." However, even when edge 711 of conductor 706 is perturbed (resulting in perturbed edge 712 which now no longer touches the second bounding cube), the bounding cube in question remains valid because it still extends to the edge of the nearest conductor, i.e., conductor 702. Thus, random walk path 708 can remain, without modification.

The complexity of the present floating random walk-based capacitance sensitivity techniques is now compared to that of the conventionally employed adjoint method. It is assumed that all of the conductors in a given geometry are perturbed according to the present technique. This means that all of the simulation paths will be continued. Consequently, the ratio of the additional cost required for computing the capacitance sensitivities with respect to all of the geometrical variations to the cost of computing the nominal capacitances is proportional to the ratio of the length of the continuation paths to the length of the nominal paths. Since all perturbations describe small variations, no one capacitance will significantly change. Consequently, most of the path continuations are short, which means that the desired ratio is less than one and therefore the total complexity (of solving the nominal and perturbed systems) is less than two times the complexity of solving just the nominal capacitance. This bound indicates that this method (despite being finite difference based) is computationally superior to the adjoint method which typically facilitates computing both the nominal and sensitivity analysis in 2.5 times the cost of solving the nominal system.

The error associated with the sensitivity analysis of the present techniques is now described. The random variables $$X = \frac{1}{N}\sum_{i=1}^{N} x_i \text{ and } Y = \frac{1}{N}\sum_{i=1}^{N} y_i$$

are defined, wherein N is the total number of random walks and $\{x_i\}$ and $\{y_i\}$ are sequences of identically distributed (i.i.d.) random variables associated with the nominal and perturbed random walks, respectively. Due to the path continuation process (which results in path sharing), the pairs $(x_i, y_i)$ are correlated. The capacitance sensitivity C.S. with respect to a deterministic parameter perturbation dP as obtained from the floating random walk is defined as:

$$C.S. = \frac{Y - X}{dP}. \tag{6}$$

The following summarizes some of the properties of the present capacitance sensitivity estimator. The sensitivity as obtained from Equation 6 is an unbiased estimator of true sensitivity. Furthermore, the confidence interval associated with this estimator is given by:

$$\text{var}(C.S.) = \frac{1}{N} \frac{\text{var}(x_0) + \text{var}(y_0) - 2\text{cov}(x, y)}{dP^2}. \tag{7}$$

It is observed that as N increases the variance of the difference decreases asymptotically as $O(\sqrt{N})$. It is further noted that the correlation between the different paths enhances the accuracy of the sensitivity estimator. Note that the sample covariance is computed from the Pearson product-moment correlation coefficient:

$$\text{cov}(x, y) = \frac{1}{N}\sum_{i=1}^{N} x_i y_i - \mu_x \mu_y. \tag{8}$$

The correlation coefficient is typically larger than 0.5.

While the above capacitance sensitivity techniques are suitable for analyzing small geometric perturbations (e.g., less than or equal to about a ten percent change in the shape of a conductor(s)), a different approach is needed when the perturbations are large. In the following description, incremental variation analysis techniques are described that allow one to compute capacitances of "similar" geometries resulting from multiple large variations, not captured efficiently via sensitivity analysis. As compared to slight changes in conductor shape, large variations encompass those changes in conductor shape that are greater than 10 percent of the nominal value of the geometric parameter of interest. Before proceeding it is important to clarify what is meant by "similar" geometries as opposed to sensitivity analysis or significant variations. "Similar" geometries are those that have the same geometrical topology as one another and differ only with regard to some parameters describing the geometry. In the following description, the term configuration will be used to refer to a geometry constructed by altering a subset of parameters of an original (nominal) geometry. Furthermore, the terminology "high order" ("low order") will be used to refer to geometries constructed by altering a large (small) number of the geometrical parameters of the nominal geometry.

The number of all possible "similar" configurations depends exponentially on the total number of geometrical parameters. Therefore, the techniques are almost always constrained to low order models. Even if efficient techniques, such as subspace recycling, are used to accelerate the solution of such large number of configurations, the fact cannot be avoided that with a larger perturbation of the system matrix the subspace spanned by the perturbed matrix varies significantly from that spanned by the nominal configuration. The following description demonstrates one of the main computational advantages associated with the floating random walk technique, namely, the efficiency of computing the capacitances of high order configurations.

Figure 8:
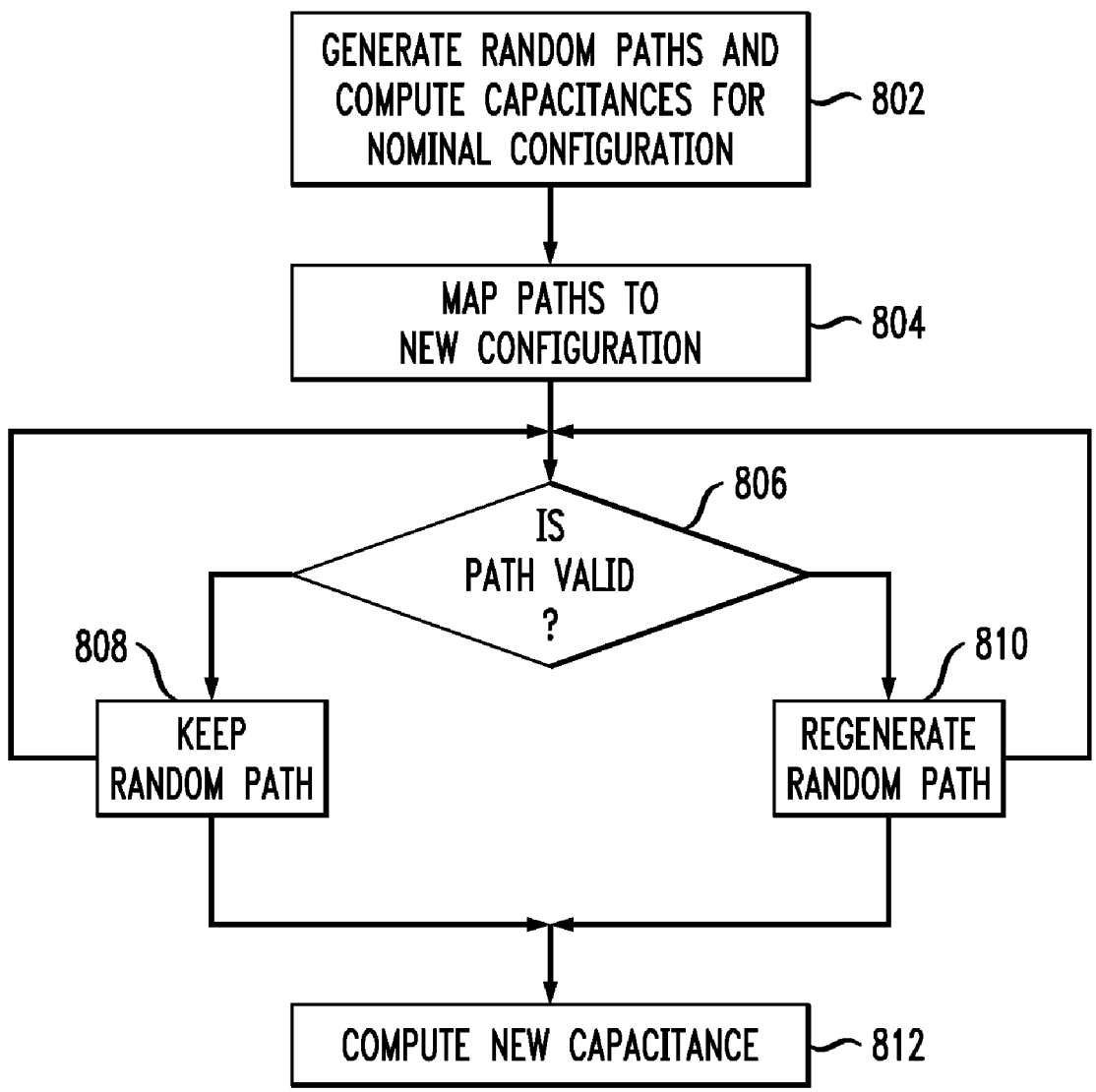
FIG. 8 is a diagram illustrating an exemplary methodology for determining coupling capacitance of integrated circuit designs having similar geometries according to an embodiment of the present invention.

FIG. 8 is a diagram illustrating exemplary methodology 800 for determining coupling capacitance of integrated circuit designs having similar geometries. As described above, the notion of similar geometries refers to the fact that the designs have the same geometrical topology as one another but differ with regard to one or more parameters describing the geometry. By way of example only, two integrated circuit designs would be considered to have similar geometries if both designs have the same layout (e.g., number and placement) of conductors (same topology) but the geometry of one or more of the conductors is different in the two designs. It is important to note that this concept of similar geometries may also be applicable to the sensitivity analysis presented above, as long as the geometric variations are small.

In step 802, a floating random walk technique is used to create random walk paths for an original (nominal) integrated circuit design configuration. This floating random walk technique is described above. The paths are then used to determine coupling capacitance between conductors in this nominal configuration (also described above). In step 804, the nominal paths are mapped to a new, geometrically similar configuration. The new, geometrically similar configuration can be obtained by perturbing one or more of the conductors in the nominal configuration. According to an exemplary embodiment, multiple conductors are perturbed and the perturbations are large, as defined above.

The mapping may be achieved by superimposing the nominal paths on the space containing the perturbed conductors. Such super-imposition will reveal the positions of the nominal paths relative to the positions of all the conductor edges in the perturbed configuration.

In step 806, for each of the nominal paths, a determination is made as to whether or not the path in question is valid for the new configuration. As described above, a path is valid if all transition cubes associated therewith extend to the edge of the nearest conductor, but do not include any conductor(s). If the path in question is valid, then in step 808 the path is maintained. The process beginning at step 806 can be repeated until all paths are evaluated.

On the other hand, if the path in question is not valid for the new configuration, then in step 810, that path is modified (regenerated at least in part), i.e., starting from the first non-reusable transition cube. As above, the process beginning at step 806 can be repeated until all paths are evaluated. Once all of the paths have been evaluated, then in step 812, the capacitance for the new design can be calculated. Each path whether nominal or regenerated has its own contribution to the capacitance value. This contribution is added to the nominal or perturbed capacitance one path at a time. The capacitance may be calculated using the following formula given in U.S. Patent Application Publication Number 2010/0122223 A1 (that also accounts for arbitrary multilayered dielectric media in between the conductors), $$C_{12} = -\sum_{i1=1}^{Nq_1} \Delta_{i1} \sum_{i2=1}^{Nq_2} \Delta_{i2} \nabla_n G(r_{i1}, r_{i2}) \sum_{i3=1}^{Nq_3} \Delta_{i3} G(r_{i2}, r_{i3}) \ldots \sum_{im=1}^{Nq_m} \Delta_{im} G(r_{im-1}, r_{im}) V_{r_{im}},$$

wherein $C_{12}$ represents the coupling capacitance between a first and a second conductor. $G(r_{i1},r_{i2})$ represents the Green's function of a first bounding cube along a random walk path, wherein $r_{i1}$ represents a center point of the first cube and $r_{i2}$ represents a boundary point of the first cube. $G(r_{i2},r_{i3})$ represents the Green's function of a second bounding cube along the random walk path. Similarly, $G(r_{im-1},r_{im})$ represents the Green's function of an m-th and final cube along the random walk path.

$$\sum_{im=1}^{Nq_m} \Delta_{im} G(r_{im-1}, r_{im})$$

is the boundary integration step for the m-th cube and $V_{r_{im}}$ is the assigned potential on the second, target conductor.

Some general observations about incremental variational analysis are now presented. A single random walk path generally has a sparse dependence on the conductor set, i.e., the number of conductors constraining a single path is very small compared to the total number of conductors. This property is emphasized further in dense structures, since the probability of path termination is large. Consequently, for any given new configuration the paths of the nominal configuration can be reused to compute the capacitance of the perturbed geometry, provided such paths were not constrained by the varying subset of parameters. On the other hand, if a path depends on the varying conductors, then such a path must be re-simulated starting from the first non-reusable transition cube. Since the number of such paths is very small compared to the total number of paths, the forward random walk technique enables the generation of only a small number of additional paths to obtain the solution of the new configuration from the previous knowledge of the solution of the nominal configuration.

This concept of incremental analysis is summarized as follows. It is assumed that the total parameter set describing the geometrical variations is composed of K parameters. A configuration $C_j^K$ is defined as the geometry constructed by altering the parameters indexed by the j-tuple $j=(j_1, j_2, \ldots, j_j)$ such that $j_i \in \{1, \ldots, K\}$. It is also assumed that $C_0^K$ is the nominal configuration and further that the floating random walk simulation of such configuration has been completed. The resulting paths are indicated by $\wp_0$. The paths are partitioned into groups $\wp_{ji}$ such that each group includes all the paths that depends on parameter $j_i$. It is notable that these groups are not mutually exclusive. The number of paths in group $\wp_{ji}$ is indicated by $N_{ji}$. The set containing the paths required to be re-simulated to compute the capacitance of configuration $C_j^K$ is given by:

$$\Delta \wp_j^K = \bigcap_{i=1}^{j} \wp_{ji} \qquad (9)$$

The number of such paths is given by cardinality of the set and is less than $$\min_{1=1,\ldots,j} N_{ji}.$$

Consequently, the number of re-simulated paths decreases as the number of varying parameters increases.

It then follows that to simulate configuration $C_j^K$ only those paths that depend on all the varying conductors have to be re-simulated. Consequently, the number of re-simulated paths is strictly non-increasing as a function of j. Having described the subset of paths that needs to be re-simulated, the remaining paths and how paths are re-simulated are now described.

The same assumptions presented above regarding incremental analysis remain. It is further assumed that all capacitance of all configurations $C_m^K$, constructed by altering the parameters indexed by the m-tuple $m=(m_1,m_2,\ldots,m_m)$ such that $m_i \in \{1,\ldots,K\}$ and m<j has been extracted. Consequently, the paths of all configurations $C_m^K$ are available. To compute the capacitance of configuration $C_j^K$, the paths in the set $\wp_0 \setminus \Delta \wp_j^K$ are reused. Given a path pm $\in \wp_0 \setminus \Delta \wp_j^K$, wherein m is the m-tuple containing the indices of the parameters that constrain the path. By construction such a path was re-simulated in the configuration $C_m^K$ and can therefore be used to populate the random walks of $C_j^K$. One implication is that the configurations are simulated in a top-down fashion, i.e., starting from the nominal configuration and completing the configurations in order $C_1^K, C_2^K, \ldots, C_K^K$.

Finally, it is observed that the present techniques inherently account for the proximity of the conductors since only nearby conductors are able to constrain the same path. However, if the conductors are apart then with a high probability the relevant paths have no intersection and high order perturbations can be obtained directly from low order perturbations, as described above.

One notable implementation detail of the present techniques is namely memory utilization. If the capacitance of the configurations $C_1^K, C_2^K, \ldots, C_K^K$ is extracted sequentially, then the details of every simulated or re-simulated path have to be tracked (stored). In particular, the transition points, transition squares and the conductors constraining the transition squares of every path have to be stored. To do so however results in losing one of the main advantages of the floating random walk algorithm, namely, the fact that it does not require any memory usage. To overcome this drawback, the capacitances of all configurations can be extracted concurrently. This is achieved by generating the path for the nominal configuration, re-simulating the path only for those configurations that require it, e.g., the set given by Equation 9, above, and reusing the path (or one of its re-simulations) (see above, for example, the paths reused in set $\wp_0 \setminus \Delta \wp_j^K$). The resulting path (nominal or regenerated) is used to populate the capacitance vector of all configurations concurrently. Another path is then selected and the steps are repeated until a required confidence interval is reached. Of course, such a process is only possible since the order in which the different walks required to extract the capacitance of a single configuration is computed is arbitrary, (as a consequence of the independence of the different paths). Consequently, there is no extra memory requirements and the capacitance values of all configurations are computed concurrently, while reusing the majority of the computation.

Figure 9:
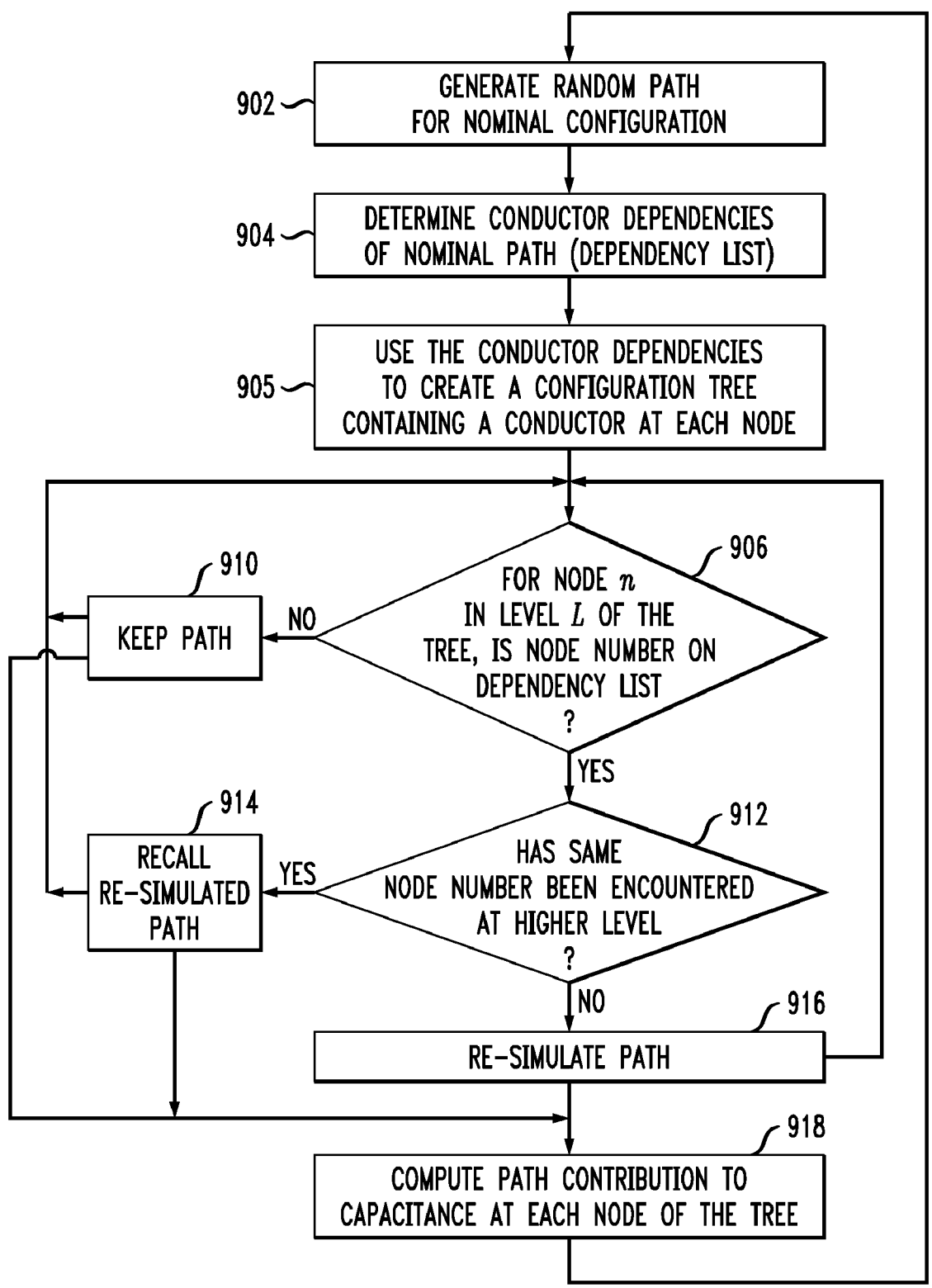
FIG. 9 is a diagram illustrating an exemplary methodology for determining capacitance of an integrated circuit designs on a path-by-path basis according to an embodiment of the present invention.

Rather than determining the capacitance for an entire configuration at once, such as with methodology 800 (see FIG. 8, described above), it is also possible to perform an incremental variational analysis on a path-by-path basis. Such an approach is preferred, for example, when a large subset of the conductors is subject to modifications wherein the number and relative positions of the conductors are unchanged. The case of modifications due to lithographic variations falls in this category. Specifically, FIG. 9 is a diagram illustrating exemplary methodology 900 for determining capacitance of integrated circuit designs on a path-by-path basis. In step 902, a floating random walk path is created for a given, nominal (original) integrated circuit configuration comprising a plurality of conductors. The nominal configuration is the configuration with respect to which all dimensional changes (perturbations) are taken. The dimensional perturbations represent geometrical changes in the conductors. As was described in detail above, geometrical changes can include perturbing an edge of a conductor(s) inward.

In step 904, conductor dependencies of the nominal path created in step 902 are determined. As was described in detail above, a random walk path can be based on a series of transition squares, each transition square extending to the edge of a nearest conductor (i.e., touches the conductor), but not including any conductor(s). Therefore, a given path (such as the nominal path) by way of the transition squares associated therewith is dependent on (and can be affect by perturbations to) one or more of the conductors in the design. Each such conductor is considered a dependent conductor for that path and is placed on a dependency list. Such dependencies are shown graphically in FIG. 10, described below (wherein the dependencies shown in FIG. 10 can be considered to be a dependency list according to the present techniques). As will be described in detail below, the implications of a conductor being placed on the dependency list is that when a conductor on the list is perturbed, some re-simulation of the nominal path is required.

Next, the design is graphically represented in a manner that depicts the conductors, the floating random walk path and on which of the conductors the floating random walk path is dependent. According to an exemplary embodiment, in step 905, the conductor dependencies are used to create a configuration tree. An exemplary configuration tree is presented in FIG. 10 and described below. In general, however, a configuration tree contains a number of levels L and a number of nodes n. A conductor number is associated with each node (except for the top-most node which represents the starting point of the tree, i.e., the nominal configuration). The number of nodes in the tree is based on the overall number of perturbed conductors in the design, i.e., $2^x$, wherein x is the number of perturbed conductors in the design. The greater the number of perturbed conductors, the greater the accuracy of the calculations, and embodiments are presented herein where all of the conductors in the design are perturbed. The number of conductors being perturbed at one time is dependent on what level L of the tree is currently being evaluated. For example, in the first level of the tree only one conductor at a time is being perturbed. In the second level of the tree exactly two conductors at a time are being perturbed, and so on.

The tree is read from top to bottom. Thus, beginning at the first node at the first level of the tree the conductor number associated with that node is perturbed. Perturbation of a conductor was described in detail above. In step 906, a determination is made as to whether or not that particular node/conductor number is on the dependency list. As highlighted above, if the conductor is not on the dependency list, then the nominal path (the path from which all changes are based) is unchanged by the perturbation. As such, in step 910, the path is not changed. The process beginning at step 906 can then be repeated for the next node/level in the tree. On the other hand, if the conductor is on the dependency list for the path, then the nominal path requires modification, i.e., re-simulation at least in part, as a result of the perturbation. However, a determination is first made in step 912 as to whether or not the same node number has already been encountered at a higher level in the tree, i.e., during an earlier iteration of the methodology. If this is the first round of the process then obviously this is the first time that dependent node number is being encountered. Step 210 prevents re-simulations of paths that have already been re-simulated. Therefore, if the path has already been re-simulated, then in step 914 the previously re-simulated path is recalled. The process beginning at step 906 can then be repeated for the next node/level in the tree. If however the node/conductor has not been previously encountered, then in step 916, the path is re-simulated. Again, the process beginning at step 906 can then be repeated for the next node/level in the tree.

Once all of the nodes at all of the levels of the tree have been evaluated, then in step 918, the path contribution to capacitance at each node in the tree is computed. Each node in the tree represents a configuration of conductors, and the random path as computed for each node has its own contribution to the capacitance of that configuration. This contribution is added for all nodes concurrently. Methodology 900 can be repeated with another nominal random walk path in the design. The number of iterations of methodology 900/nominal paths used depends on the level of accuracy required. Namely, since the floating random walk technique involves the use of probability density functions, the greater the number of paths, the greater the level of accuracy. The level of accuracy can be pre-set by a user before running methodology 900.

Figure 10:
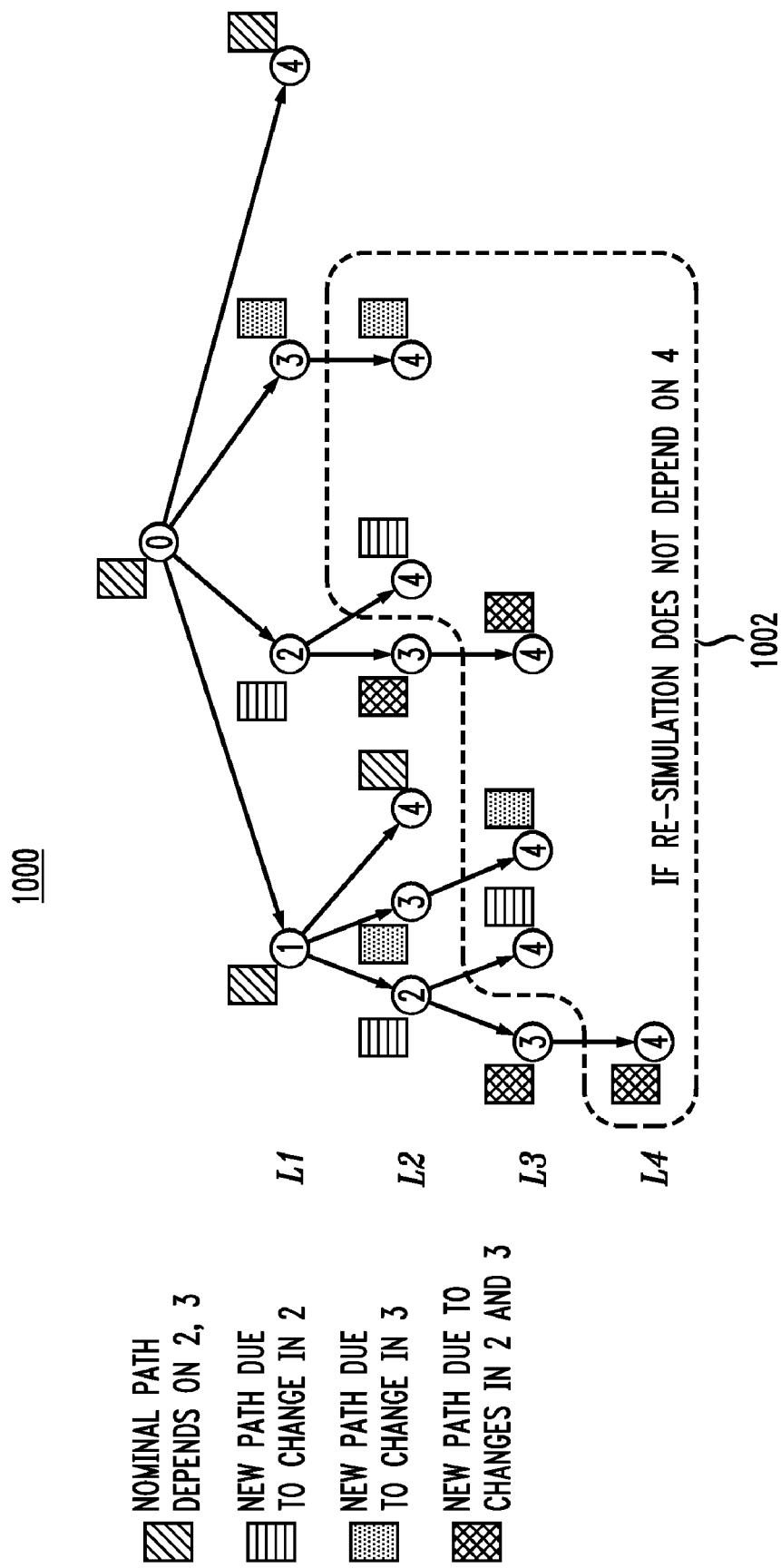
FIG. 10 is a diagram illustrating an exemplary configuration tree according to an embodiment of the present invention.

FIG. 10 is a diagram illustrating exemplary configuration tree 1000. Tree 1000 represents an exemplary integrated circuit design having four conductors wherein all four conductors are perturbed according to the process outlined in methodology 900 (FIG. 9, described above). Thus, tree 1000 has $2^4$ or 16 nodes (labeled 0-4). To help illustrate the dependencies in the design, a coded square is shown next to each node, and a code key is presented to the left of the tree. Namely, in this example, the nominal path has dependencies on conductors 2 and 3, but not on conductors 1 and 4. Thus, beginning at level L1 and working left to right, first conductor 1 (and only conductor 1) is perturbed. Since the nominal path does not have a dependency on conductor 1, the nominal path is unchanged by the perturbation. Next conductor 2 (and only conductor 2) is perturbed. Since the nominal path has a dependency on conductor 2, then the nominal path has to be re-simulated, at least in part, due to the perturbation. Since the perturbed node/conductor 2 has not been encountered before, the nominal path is modified, i.e., re-simulated. The same is true for a perturbation to conductor 3. Conductor 4 on the other hand, like conductor 1, when perturbed does not require a re-simulation of the nominal path.

Moving on to level L2, conductor 1 and conductor 2 are perturbed. As above, a perturbation of conductor 1 does not require a re-simulation of the path, but perturbation of conductor 2 does. However, the path for a perturbation of conductor 2 has already been re-simulated in level L1, see above. Therefore, the re-simulated path based on the perturbation of conductor 2 can simply be re-called, rather than re-simulated. The same is true for a perturbation of conductors 1 and 3. A perturbation of conductors 1 and 4 does not require re-simulation, as neither conductor 1 nor conductor 4 affects the nominal path. In the next grouping, conductor 2 and conductor 3 are perturbed. Since the perturbation of both of these conductors affects the nominal path, the path has to be re-simulated (see code key which indicates that a new path is created due to changes in conductors 2 and 3). Conductors 2 and 4 are then perturbed. Since the perturbation of conductor 4 does not affect the path, then the re-simulated path for conductor 2 from level L1 can be re-called. The same situation applies for a perturbation of conductors 3 and 4.

Moving on to level L3, conductor 1, conductor 2 and conductor 3 are perturbed. Since conductor 1 does not affect the path, then the re-simulated path resulting from the perturbation of conductors 2 and 3 from level L2 can be re-called. Similarly, when conductor 1, conductor 2 and conductor 4 (wherein conductors 1 and 4 do not affect the path) are perturbed, the re-simulated path for perturbed conductor 2 can be re-called from level L1. In the next grouping, conductor 2, conductor 3 and conductor 4 are perturbed. Since conductor 4 does not affect the path, then the re-simulated path from the perturbation of conductors 2 and 3 can be re-called from level L2.

Moving on to level L4, conductor 1, conductor 2, conductor 3 and conductor 4 are perturbed. Again since conductors 1 and 4 do not affect the path, then the re-simulated path from the perturbation of conductors 2 and 3 can be re-called from level L2. The nodes encircled by dotted line 1002 highlight that one should be mindful of the rare instance where a regenerated path has a dependency on conductor 4. In that case, perturbation of conductor 4 would call for a regeneration of that path. As a result, of the simulations presented in tree 1000, all possible configurations of the nominal path have been evaluated. The term "configuration" in this context refers to an instantiation of a conductor topology (i.e., a conductor layout of a design) that is indexed by its varying parameters (i.e., conductor geometries). A path index indicated the conductors on which a single path depends.

The general process used for creating a configuration tree will now be described. The initial level, level L0, is the root of the configuration tree and is the nominal configuration with respect to which all dimensional perturbations are taken. Level L1 is made of those configurations in which one and only one conductor is modified with respect to the nominal configuration. Level L2 is made of those configurations in which two and only two conductors are modified with respect to the nominal configuration. In general, level Lx in the configuration tree is made of those configurations in which x and only x conductors are modified with respect to the nominal configuration. A node in a given level is labeled with the index of that conductor which is modified above and beyond its parent node in the previous level. In order to avoid the double counting of configurations, each level in the tree is filled out from left to right while making sure that creation of new nodes is mindful of nodes previously created. With reference to FIG. 10, note how in the second level, node 3 is a child of node 2 but node 2 is not a child of node 2. This is because the configuration (2,3) in which conductors 2 and 3 are modified has already been accounted for, as described above. Thus, a configuration in the tree is uniquely determined by tracing up the tree the labels of the nodes which give the indices of the conductors that are perturbed in that configuration with respect to the nominal configuration. Note that the size of the tree is related to the size of the set of conductors subject to modification. If in a system of n conductors all of the conductors are subject to modification, then the size of the tree is $2^n$. If only p<n conductors are subject to modification, the size is $2^p$. The benefits of the incremental analysis is higher the higher the number of conductors subject to modification.

Figure 11:
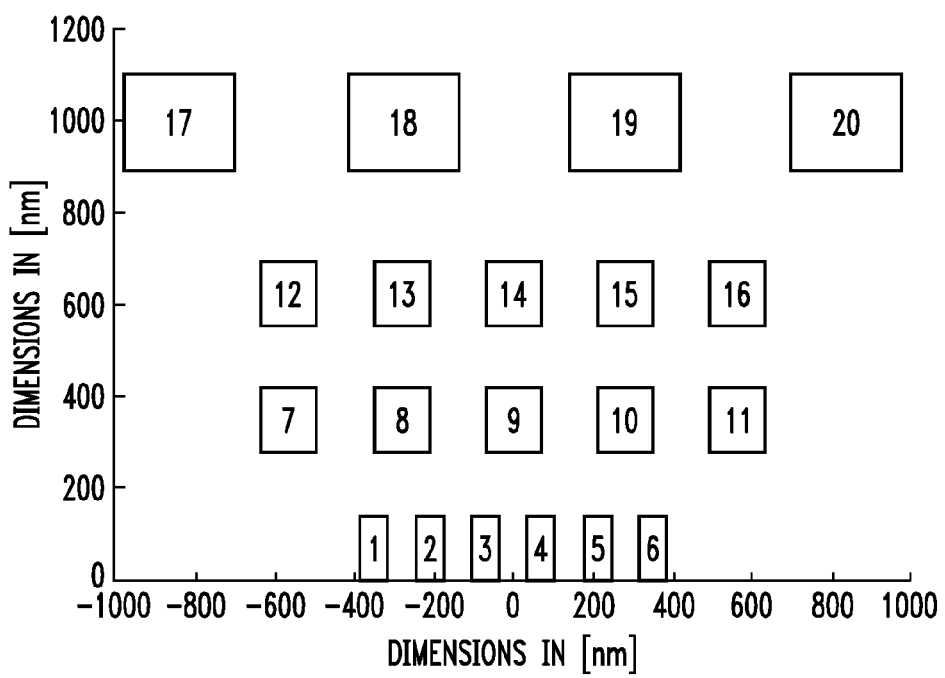
FIG. 11 is a two-dimensional cross-sectional view of a 20 conductor geometry according to an embodiment of the present invention.
Figure 12:
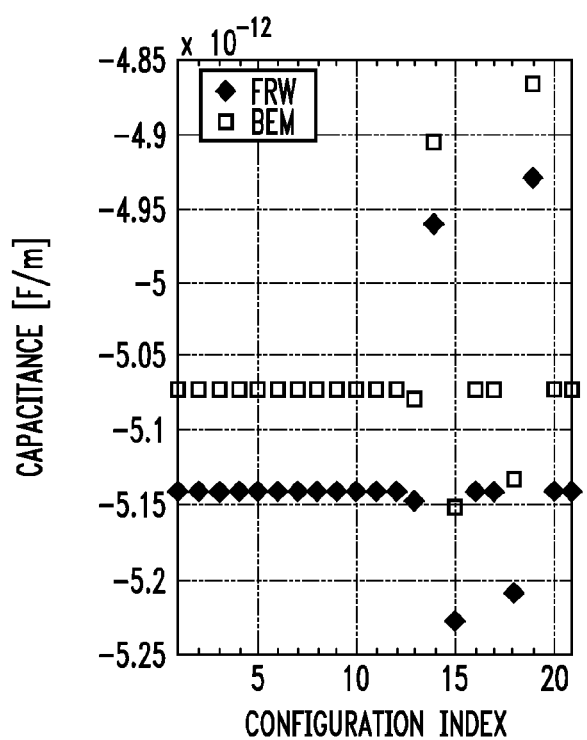
FIG. 12 is a graph illustrating a comparison between capacitance values obtained from the present forward random walk technique as compared to those obtained from a standard boundary-element method for the geometry of FIG. 11 according to an embodiment of the present invention.
Figure 13:
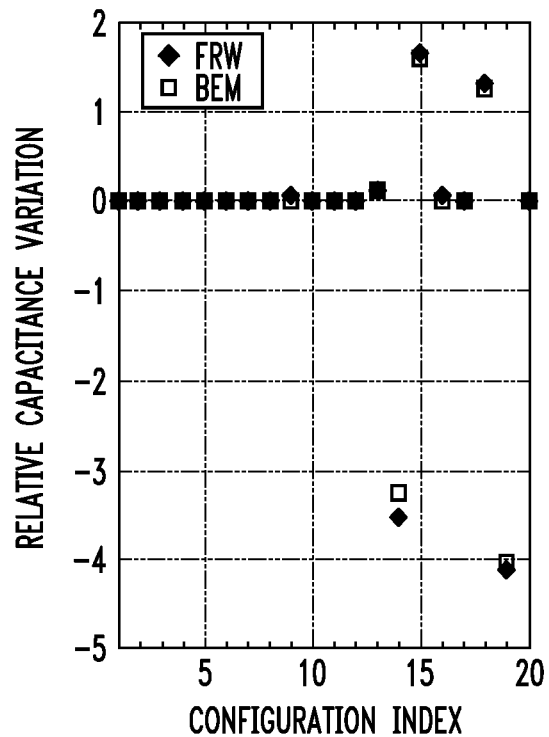
FIG. 13 is a graph illustrating relative sensitivity showing error cancellation due to random walk correlation according to an embodiment of the present invention.

The effectiveness of the capacitance sensitivity analysis, described above, is demonstrated by computing the sensitivities of a 20 conductor structure shown in FIG. 11 to variations in the conductor geometries. Namely, FIG. 11 is a two-dimensional cross-sectional view of a 20 conductor geometry wherein each conductor is labeled 1-20 accordingly. The dimensions of the conductors are given on the x and y axes in nanometers (nm). Conductor 14 is the target conductor for which the capacitance vector is extracted. A configuration k is constructed by reducing the width and thickness of a given conductor k by two percent, while keeping all other conductors in their nominal size. The total number of configurations is 20. Consequently, the sensitivity of the geometry can be computed with respect to shape variations (shrinking, expansion). The capacitances $C_{14,19}$ obtained from the present forward random walk technique (FRW) is compared to those obtained from a standard boundary-element method (BEM) for all different configurations in FIG. 12. In graph 1200, the configuration index is plotted on the x axis and capacitance (measured in Farads per meter (F/m)) is plotted on the y axis. The confidence interval is set to one percent. Configuration 21 represents the nominal configuration. FIG. 13 is a graph 1300 illustrating relative sensitivity showing error cancellation due to random walk correlation. In graph 1300, the configuration index is plotted on the x axis and relative capacitance variation is plotted on the y axis. In graph 1300, the percentage relative variation in the capacitance $$\frac{C_{14,19}^{(i)} - C_{14,19}^{(21)}}{C_{14,19}^{(21)}} \times 100$$

is computed, wherein i is the configuration index and $C_{14,19}^{(21)}$ is the nominal capacitance. It is observed that the accuracy of the absolute variation $C_{14,19}^{(i)} - C_{14,19}^{(21)}$ is about one percent, due to the error cancellation resulting from the correlation between the perturbed and nominal configurations (10). The sample correlation coefficient (11) is approximately 0.8. The total time required to complete floating random walk sensitivity analysis is only a factor 1.39 larger (i.e., 1.39 times) than the nominal simulation time, as opposed to 20 times obtained from the standard finite difference technique or the 2.5 times obtained from the standard adjoint method. Furthermore, the present sensitivity analysis is about 10 times faster than the BEM adjoint sensitivity analysis and about 100 times faster than the BEM finite difference sensitivity analysis.

Figure 14:
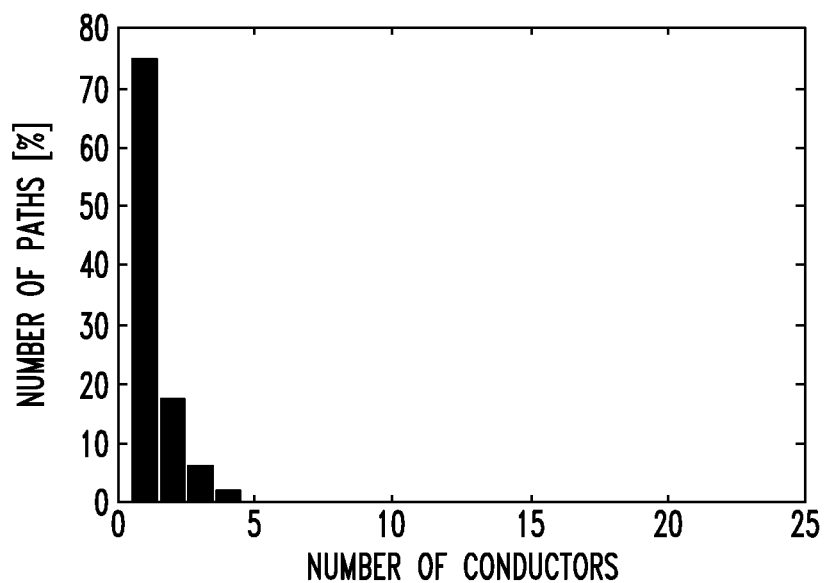
FIG. 14 is a graph illustrating a percentage of paths dependent on a particular number of conductors according to an embodiment of the present invention.

Next, it is demonstrated how the present floating random walk techniques are used to efficiently compute capacitances of perturbed geometries. The focus of this example is on large perturbations not captured via sensitivity analysis. First, FIG. 14 is a graph 1400 illustrating a percentage of paths dependent on a particular number of conductors. In graph 1400, the number of conductors is plotted on the x axis and the number of paths (a percentage of paths) is plotted on the y axis. Graph 1400 demonstrates the sparse dependence of the nominal random walk paths on the conductors. It is observed that more than 73 percent of all paths end at the target conductor without touching any other conductor. Another 18 percent of the paths depend only on the target and destination conductors. It is further observed that almost all the rest of the paths depend on either three or four conductors. Consequently, any perturbation affecting more than five conductors can be simulated with almost no additional effort. Such sparse dependence constitutes the fundamental strength of the floating random walk technique.

Figure 15:
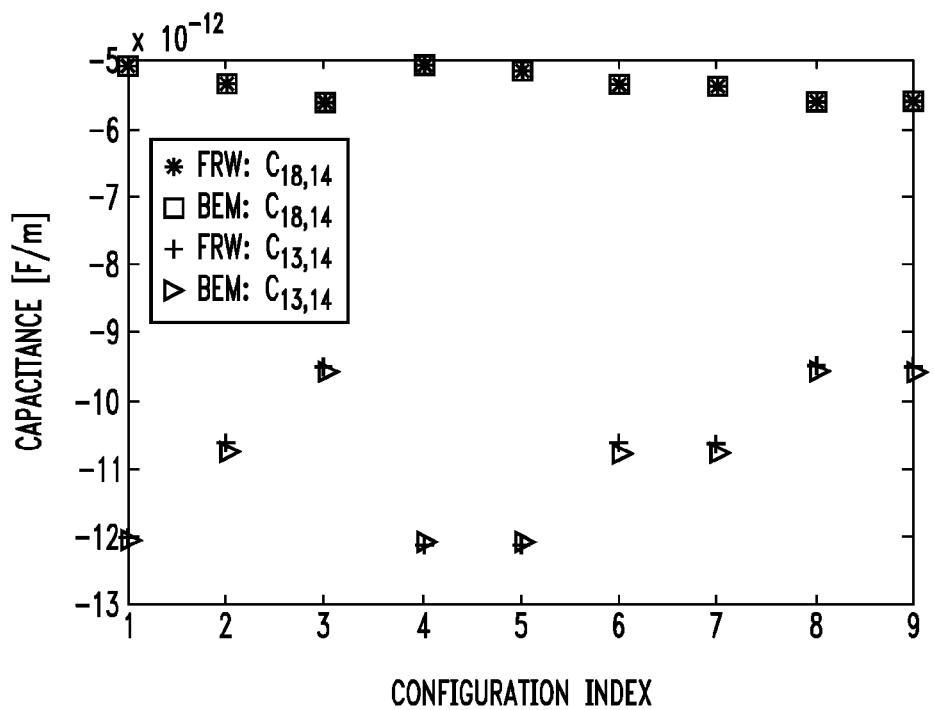
FIG. 15 is a graph validating the accuracy of the present floating random walk-based variational analysis compared to the boundary element method according to an embodiment of the present invention.
Figure 16:
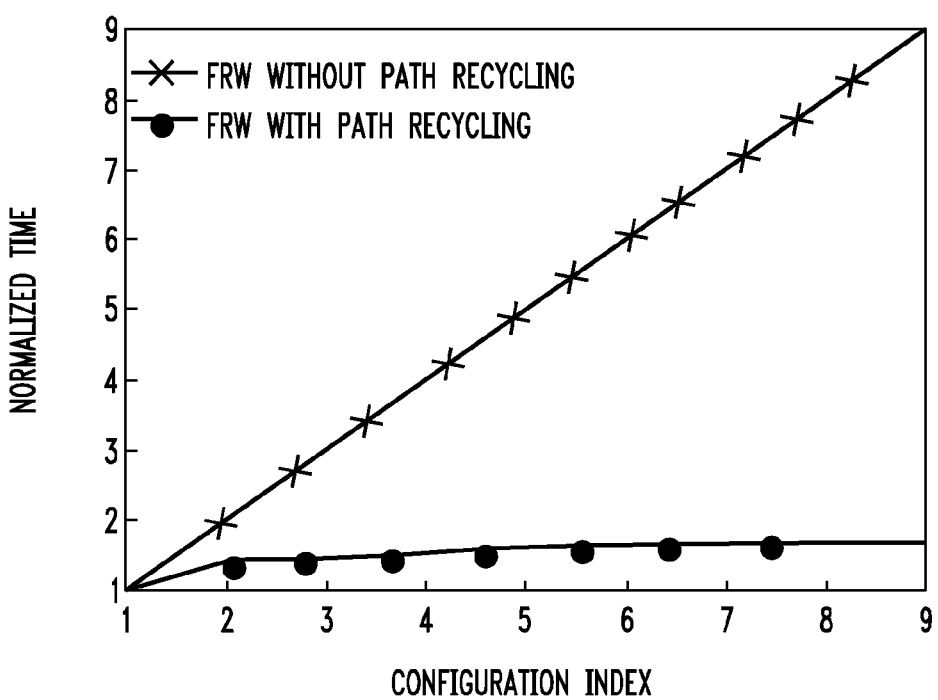
FIG. 16 is a graph illustrating cumulative simulation time for handling additional configurations using the present floating random walk-based variational techniques as compared to the estimated standard time according to an embodiment of the present invention.

The accuracy of the variational analysis is demonstrated in FIG. 15 by comparing the capacitances $C_{18,14}$ and $C_{13,14}$ obtained from the present variational analysis techniques to those obtained from the standard boundary element method. Namely FIG. 15 is a graph 1500 validating the accuracy of the present floating random walk-based variational analysis compared to a robust BEM. In graph 1500, the configuration index is plotted on the x axis and capacitance (measured in F/m) is plotted on the y axis. The comparison is demonstrated for nine different configurations. These configurations correspond to shrinking conductors 13 and 15 (i.e., the right and left conductors surrounding conductor 14 in FIG. 11) by factors of (0,0), (12.4 percent, 0), (25 percent, 0), (0,12.5 percent), (0,25 percent), (12.5 percent, 12.5 percent), (12.5 percent, 25 percent), (25 percent, 12.5 percent) and (25 percent, 25 percent), respectively. The accuracy is better than five percent for all configurations. Furthermore, in FIG. 16 the simulation time required to compute the capacitance of nine different configurations using the present floating random walk-based techniques is shown as compared to the linear increase in time typical of the standard method without path recycling. Namely, FIG. 16 is a graph 1600 illustrating cumulative simulation time for handling additional configurations using the present floating random walk-based variational techniques as compared to the estimated standard time. In graph 1600, the configuration index is plotted on the x axis and the normalized time is plotted on the y axis. The floating random walk technique (FRW) is shown with and without path recycling. The sublinear complexity of the present techniques is clearly demonstrated.

Figure 17:
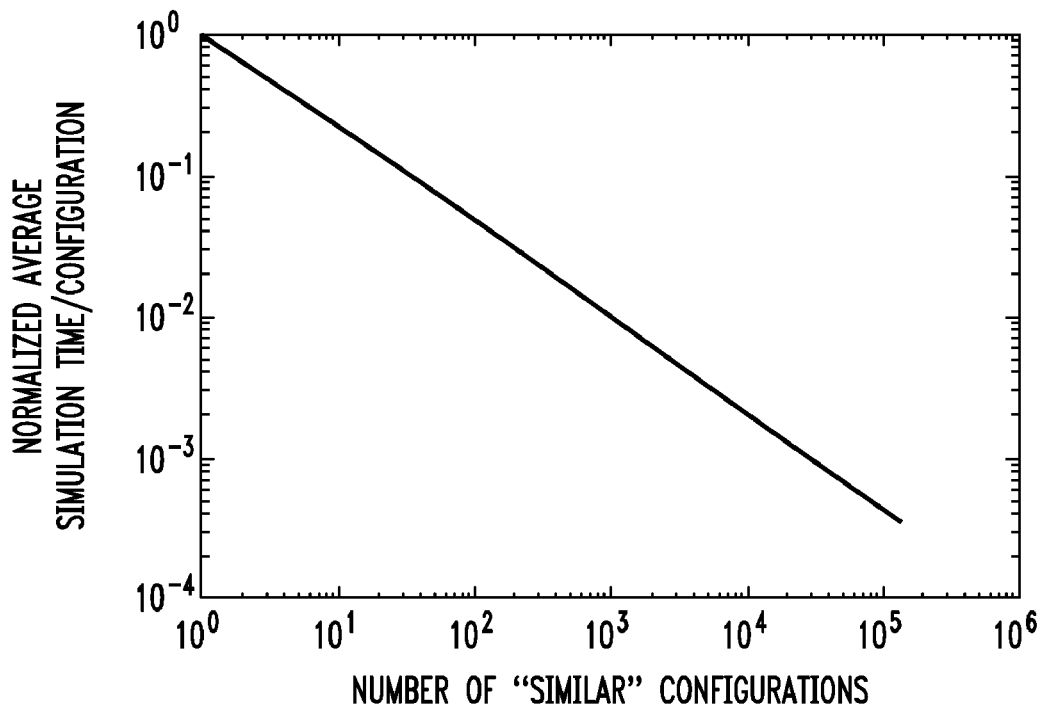
FIG. 17 is a log-log plot demonstrating the reduction in the average simulation time with the increase number of configurations according to an embodiment of the present invention.

Finally, this observation is validated by computing the time required to generate all sparse grid points in a 20-dimensional space required for expansions of polynomial exactness 3, 5, 7, and 9 [14]. The total number of grid points of such constructions is 41, 861, 12341 and 135751 respectively. The relation between the number of solves and the average simulation time per configuration is shown in FIG. 17. FIG. 17 is a log-log plot 1700 demonstrating the reduction in the average simulation time with the increase number of configurations. In plot 1700, the number of "similar" configurations is plotted on the x axis and the normalized average simulation time per configuration is plotted on the y axis. The configurations are constructed based on the $5^{th}$ order sparse grid. It can be inferred that that time required to solve an additional configuration after solving $10^5$ configurations is seven milliseconds (msec). It is observed that the average simulation time per configuration is reduced when the number of similar configurations are increased. Practically speaking, the total simulation time required for solving all the 12,341 configurations is less than the time required by the present techniques to solve 22 independent configurations (i.e., less than 0.2 percent of the time required to solve all configurations independently, corresponding to a speedup of 561 times). Moreover, the time required to solve a total of 130,000 "similar" configurations is the same time required for solving less than 50 independent configurations, or equivalently the average simulation time per one solve is reduced by three orders of magnitude.

Figure 18:
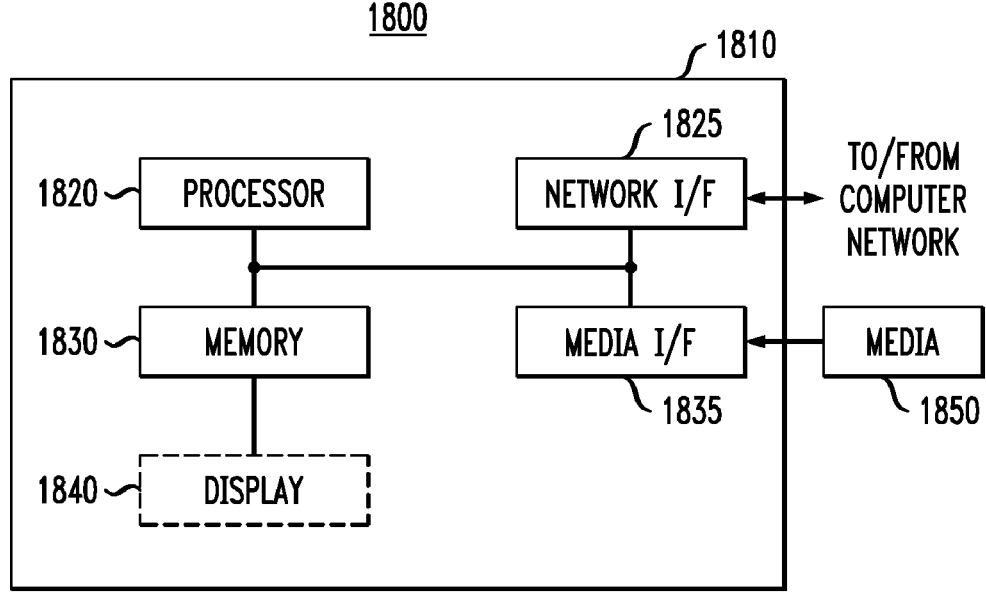
FIG. 18 is a diagram illustrating an exemplary system for implementing one or more of the methodologies presented herein according to an embodiment of the present invention.

Turning now to FIG. 18, a block diagram is shown of an apparatus 1800 for analyzing variational coupling capacitance between conductors in an integrated circuit design, in accordance with one embodiment of the present invention. It should be understood that apparatus 1800 represents one embodiment for implementing one or more of the methodologies presented herein.

Apparatus 1800 comprises a computer system 1810 and removable media 1850. Computer system 1810 comprises a processor 1820, a network interface 1825, a memory 1830, a media interface 1835 and an optional display 1840. Network interface 1825 allows computer system 1810 to connect to a network, while media interface 1835 allows computer system 1810 to interact with media, such as a hard drive or removable media 1850.

As is known in the art, the methods and apparatus discussed herein may be distributed as an article of manufacture that itself comprises a machine-readable medium containing one or more programs which when executed implement embodiments of the present invention. For instance, the machine-readable medium may contain a program configured to compute coupling capacitance between conductors of interest from the design using a set of floating random walk paths; perturb one or more of the conductors; modify any of the floating random walk paths affected by the perturbation; and recompute the coupling capacitance between the conductors of interest to include the modified floating random walk paths.

The program can also be configured to select a conductor from the design to be perturbed; choose an edge of the selected conductor on which one or more of the floating random walk paths terminate; perturb the edge of the selected conductor inward by an amount that changes a geometry of the selected conductor by less than or equal to about 10 percent; extend any of the floating random walk paths that terminate on the unperturbed edge to the perturbed edge; recompute the coupling capacitance between the conductors of interest to include the extended floating random walk paths; and determine coupling capacitance sensitivity with respect to the perturbed edge.

Further, the program can be configured to identify any of the floating random walk paths that do not terminate on the unperturbed edge but are still affected by the perturbation; determine if each of the identified floating random walk paths is still valid; and modify any of the identified floating random walk paths that are invalid after the perturbation.

Additionally, the program can be configured to perturb the one or more conductors to create a new integrated circuit design, wherein each of the one or more conductors is perturbed by an amount that changes a geometry of that conductor by greater than or equal to about 10 percent; map the floating random walk paths to the new integrated circuit design; determine whether each of the floating random walk paths mapped to the new integrated circuit design is valid in the new integrated circuit design; modify any of the floating random walk paths mapped to the new integrated circuit design that are invalid; maintain any of the floating random walk paths mapped to the new integrated circuit design that are valid; and compute coupling capacitance between conductors of interest from the new integrated circuit design.

Furthermore, the program can be configured to for a given one of the floating random walk paths, determine on which of the conductors the floating random walk path is dependent; graphically represent the design in a manner that depicts the conductors, the floating random walk path and on which of the conductors the floating random walk path is dependent; perturb one or more of the conductors by an amount that changes a geometry of each of the perturbed conductors by greater than or equal to about 10 percent; use the graphical representation of the design to determine whether or not the floating random walk path is dependent on the one or more perturbed conductors; modify the floating random walk path if the floating random walk path is dependent on the one or more perturbed conductors; and maintain the floating random walk path if the floating random walk path is not dependent on the one or more perturbed conductors.

The machine-readable medium may be a recordable medium (e.g., floppy disks, hard drive, optical disks such as removable media 1850, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used.

Processor 1820 can be configured to implement the methods, steps, and functions disclosed herein. The memory 1830 could be distributed or local and the processor 1820 could be distributed or singular. The memory 1830 could be implemented as an electrical, magnetic or optical memory, or any combination of these or other types of storage devices. Moreover, the term "memory" should be construed broadly enough to encompass any information able to be read from, or written to, an address in the addressable space accessed by processor 1820. With this definition, information on a network, accessible through network interface 1825, is still within memory 1830 because the processor 1820 can retrieve the information from the network. It should be noted that each distributed processor that makes up processor 1820 generally contains its own addressable memory space. It should also be noted that some or all of computer system 1810 can be incorporated into an application-specific or general-use integrated circuit.

Optional video display 1840 is any type of video display suitable for interacting with a human user of apparatus 1800. Generally, video display 1840 is a computer monitor or other similar video display.

In conclusion, presented herein is a new finite-difference-based sensitivity analysis within improved floating random walk techniques to efficiently compute capacitance sensitivities with respect to a large number of parameter variations. The new techniques are 10 times faster than the standard adjoint sensitivity analysis based on the boundary element method. Furthermore, it has been demonstrated that the expected complexity of computing the nominal capacitance and all the sensitivities is less than two times that of computing only the nominal capacitance regardless of the number of parameters. Moreover, error bounds have been derived for the sensitivities obtained from the present floating random walk techniques.

Also presented herein is a new floating random walk technique to compute the capacitances of "similar" configurations resulting from simultaneous non-infinitesimal perturbations of the geometrical parameters of the original geometry. With the new technique, the average time required to solve a single configuration within a set of similar configurations is reduced as the cardinality of the set is increased. It is observed that the average simulation time of a single configuration of a set of similar configurations of cardinality 105 is reduced by three orders of magnitude. Consequently, more than 130,000 similar configurations were able to be solved in the time required to solve just 50 independent configurations, which will naturally fit in a litho- and CMP-aware extraction flows.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A computer-implemented method for analyzing variational coupling capacitance between conductors in an integrated circuit design, the method comprising the steps of:
computing coupling capacitance between conductors of interest from the design using a set of floating random walk paths;
perturbing one or more of the conductors of interest;
modifying any floating random walk paths in the set of floating random walk paths affected by the perturbing step to obtain modified floating random walk paths; and
recomputing the coupling capacitance between the conductors of interest to include the modified floating random walk paths,
wherein at least one of the steps is carried out using a computer device.

2. The method of claim 1, further comprising the steps of:
selecting a conductor from the design to be perturbed;
choosing an edge of the selected conductor on which one or more floating random walk paths from the set of floating random walk paths terminate;
perturbing the edge of the selected conductor inward by an amount that changes a geometry of the selected conductor by less than or equal to about 10 percent;
extending any floating random walk paths in the set of floating random walk paths that terminate on the edge when unperturbed to the perturbed edge to obtain extended floating random walk paths;
recomputing the coupling capacitance between the conductors of interest to include the extended floating random walk paths; and
determining coupling capacitance sensitivity with respect to the perturbed edge.

3. The method of claim 2, further comprising the step of:
determining which floating random walk paths in the set of floating random walk paths terminate on the unperturbed edge.

4. The method of claim 1, wherein the step of computing coupling capacitance between conductors of interest further comprises the steps of:
selecting a first conductor and a second conductor from the conductors of interest;
creating a Gaussian surface around the first conductor;
creating a floating random walk path starting at a randomly selected point on the Gaussian surface and terminating on the second conductor; and
using the floating random walk path to compute the coupling capacitance between the first and second conductors.

5. The method of claim 2, wherein the step of determining coupling capacitance sensitivity further comprises the steps of:
adding a value of each of the floating random walk paths that terminate on the unperturbed edge of the selected conductor to a nominal capacitance of the design;
adding a value of each of the extended floating random walk paths that terminate on the perturbed edge to a perturbed capacitance of the design;
adding a value of each floating random walk path in the set of floating random walk paths that terminates at a conductor other than the selected conductor to both the nominal and perturbed capacitance of the design; and
defining the coupling capacitance sensitivity as a difference between the perturbed capacitance of the design and the nominal capacitance of the design with respect to the perturbed edge.

6. The method of claim 2, further comprising the steps of:
identifying any floating random walk paths in the set of floating random walk paths that do not terminate on the unperturbed edge but are still affected by the perturbing step;
determining if each of the identified floating random walk paths is still valid; and
modifying any of the identified floating random walk paths that are invalid after the perturbing step.

7. The method of claim 1, further comprising the steps of:
perturbing the one or more conductors of interest to create a new integrated circuit design, wherein each of the one or more conductors of interest is perturbed by an amount that changes a geometry of that conductor by greater than or equal to about 10 percent;
mapping the set of floating random walk paths to the new integrated circuit design;
determining whether each floating random walk path in the set of floating random walk paths mapped to the new integrated circuit design is valid in the new integrated circuit design;
modifying any floating random walk paths in the set of floating random walk paths mapped to the new integrated circuit design that are invalid;
maintaining any floating random walk paths in the set of floating random walk paths mapped to the new integrated circuit design that are valid; and
computing coupling capacitance between conductors of interest from the new integrated circuit design.

8. The method of claim 1, further comprising the steps of:
for a given floating random walk path in the set of floating random walk paths, determining on which of the conductors of interest the given floating random walk path is dependent;
creating a graphical representation of the design that depicts the conductors of interest, the given floating random walk path and on which of the conductors of interest the given floating random walk path is dependent;
perturbing one or more of the conductors of interest by an amount that changes a geometry of each of the conductors that are perturbed by greater than or equal to about 10 percent;
using the graphical representation of the design to determine whether or not the given floating random walk path is dependent on the conductors that are perturbed;
modifying the given floating random walk path if the given floating random walk path is dependent on the conductors that are perturbed; and
maintaining the given floating random walk path if the given floating random walk path is not dependent on the conductors that are perturbed.

9. The method of claim 8, wherein the step of determining on which of the conductors of interest the given floating random walk path is dependent, further comprises the step of:
determining which of the conductors of interest that if changed would result in a change in the given floating random walk path.

10. The method of claim 8, further comprising the step of:
creating a dependency list containing the conductors of interest on which the given floating random walk path is dependent.

11. The method of claim 8, wherein the step of creating a graphical representation of the design, further comprises the step of:
creating a configuration tree that depicts the conductors of interest, the given floating random walk path and on which of the conductors of interest the given floating random walk path is dependent, the configuration tree comprising levels L1 through Lx, each of the levels comprising one or more nodes and each of the nodes having a conductor associated therewith.

12. An apparatus for analyzing variational coupling capacitance between conductors in an integrated circuit design, the apparatus comprising:
a memory; and
at least one processor, coupled to the memory, operative to:
compute coupling capacitance between conductors of interest from the design using a set of floating random walk paths;
perturb one or more of the conductors of interest;
modify any floating random walk paths in the set of floating random walk paths affected by the perturb step to obtain modified floating random walk paths; and
recompute the coupling capacitance between the conductors of interest to include the modified floating random walk paths.

13. The apparatus of claim 12, wherein the at least one processor is further operative to:
select a conductor from the design to be perturbed;
choose an edge of the selected conductor on which one or more floating random walk paths from the set of floating random walk paths terminate;
perturb the edge of the selected conductor inward by an amount that changes a geometry of the selected conductor by less than or equal to about 10 percent;
extend any floating random walk paths in the set of floating random walk paths that terminate on the edge when unperturbed to the perturbed edge to obtain extended floating random walk paths;
recompute the coupling capacitance between the conductors of interest to include the extended floating random walk paths; and
determine coupling capacitance sensitivity with respect to the perturbed edge.

14. The apparatus of claim 13, wherein the at least one processor is further operative to:
identify any floating random walk paths in the set of floating random walk paths that do not terminate on the unperturbed edge but are still affected by the perturb step;
determine if each of the identified floating random walk paths is still valid; and
modify any of the identified floating random walk paths that are invalid after the perturb step.

15. The apparatus of claim 12, wherein the at least one processor is further operative to:
perturb the one or more conductors of interest to create a new integrated circuit design, wherein each of the one or more conductors of interest is perturbed by an amount that changes a geometry of that conductor by greater than or equal to about 10 percent;
map the set of floating random walk paths to the new integrated circuit design;
determine whether each floating random walk path in the set of floating random walk paths mapped to the new integrated circuit design is valid in the new integrated circuit design;
modify any floating random walk paths in the set of floating random walk paths mapped to the new integrated circuit design that are invalid;
maintain any floating random walk paths in the set of floating random walk paths mapped to the new integrated circuit design that are valid; and
compute coupling capacitance between conductors of interest from the new integrated circuit design.

16. The apparatus of claim 12, wherein the at least one processor is further operative to:
for a given floating random walk path in the set of floating random walk paths, determine on which of the conductors of interest the given floating random walk path is dependent;
create a graphical representation of the design that depicts the conductors of interest, the given floating random walk path and on which of the conductors of interest the given floating random walk path is dependent;
perturb one or more of the conductors of interest by an amount that changes a geometry of each of the conductors that are perturbed by greater than or equal to about 10 percent;
use the graphical representation of the design to determine whether or not the given floating random walk path is dependent on the conductors that are perturbed;
modify the given floating random walk path if the floating random walk path is dependent on the conductors that are perturbed; and
maintain the given floating random walk path if the given floating random walk path is not dependent on the conductors that are perturbed.

17. An article of manufacture for analyzing variational coupling capacitance between conductors in an integrated circuit design, comprising a non-transitory machine-readable medium containing one or more programs which when executed implement the steps of:
computing coupling capacitance between conductors of interest from the design using a set of floating random walk paths;
perturbing one or more of the conductors of interest;
modifying any floating random walk paths in the set of floating random walk paths affected by the perturbing step to obtain modified floating random walk paths; and
recomputing the coupling capacitance between the conductors of interest to include the modified floating random walk paths.

18. The article of manufacture of claim 17, wherein the one or more programs which when executed further implement the steps of:
selecting a conductor from the design to be perturbed;
choosing an edge of the selected conductor on which one or more floating random walk paths from the set of floating random walk paths terminate;
perturbing the edge of the selected conductor inward by an amount that changes a geometry of the selected conductor by less than or equal to about 10 percent;
extending any floating random walk paths in the set of floating random walk paths that terminate on the edge when unperturbed to the perturbed edge to obtain extended floating random walk paths;
recomputing the coupling capacitance between the conductors of interest to include the extended floating random walk paths; and
determining coupling capacitance sensitivity with respect to the perturbed edge.

19. The article of manufacture of claim 18, wherein the one or more programs which when executed further implement the steps of:
- identifying any floating random walk paths in the set of floating random walk paths that do not terminate on the unperturbed edge but are still affected by the perturbing step;
- determining if each of the identified floating random walk paths is still valid; and
- modifying any of the identified floating random walk paths that are invalid after the perturbing step.

20. The article of manufacture of claim 17, wherein the one or more programs which when executed further implement the steps of:
- perturbing the one or more conductors of interest to create a new integrated circuit design, wherein each of the one or more conductors of interest is perturbed by an amount that changes a geometry of that conductor by greater than or equal to about 10 percent;
- mapping the set of floating random walk paths to the new integrated circuit design;
- determining whether each floating random walk path in the set of floating random walk paths mapped to the new integrated circuit design is valid in the new integrated circuit design;
- modifying any floating random walk paths in the set of floating random walk paths mapped to the new integrated circuit design that are invalid;
- maintaining any floating random walk paths in the set of floating random walk paths mapped to the new integrated circuit design that are valid; and
- computing coupling capacitance between conductors of interest from the new integrated circuit design.

21. The article of manufacture of claim 17, wherein the one or more programs which when executed further implement the steps of:
- for a given floating random walk path in the set of floating random walk paths, determining on which of the conductors of interest the given floating random walk path is dependent;
- creating a graphical representation of the design that depicts the conductors of interest, the given floating random walk path and on which of the conductors of interest the given floating random walk path is dependent;
- perturbing one or more of the conductors of interest by an amount that changes a geometry of each of the conductors that are perturbed by greater than or equal to about 10 percent;
- using the graphical representation of the design to determine whether or not the given floating random walk path is dependent on the conductors that are perturbed;
- modifying the given floating random walk path if the given floating random walk path is dependent on the conductors that are perturbed; and
- maintaining the given floating random walk path if the given floating random walk path is not dependent on the conductors that are perturbed.

* * * * *